United States Patent
Bocklet et al.

(10) Patent No.: US 10,083,689 B2
(45) Date of Patent: Sep. 25, 2018

(54) LINEAR SCORING FOR LOW POWER WAKE ON VOICE

(71) Applicant: Intel Corporation, Santa Clara, CA (US)

(72) Inventors: Tobias Bocklet, Munich (DE); Tomasz Dorau, Gdansk (PL); Przemyslaw Sobon, Gdynia (PL); Przemyslaw Tomaszewski, Reda (PL)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 15/390,384

(22) Filed: Dec. 23, 2016

(65) Prior Publication Data

US 2018/0182388 A1  Jun. 28, 2018

(51) Int. Cl.
| | |
|---|---|
| G06F 15/00 | (2006.01) |
| G10L 25/00 | (2013.01) |
| G10L 15/16 | (2006.01) |
| G10L 15/00 | (2013.01) |
| G10L 15/04 | (2013.01) |
| G10L 15/22 | (2006.01) |
| G10L 15/02 | (2006.01) |
| G10L 15/08 | (2006.01) |

(52) U.S. Cl.
CPC .............. *G10L 15/22* (2013.01); *G10L 15/02* (2013.01); *G10L 15/16* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,139,714 B2* | 11/2006 | Bennett ............... | G06F 17/3043 704/270.1 |
| 7,457,748 B2* | 11/2008 | Nefti ....................... | G10L 15/10 704/240 |
| 7,487,091 B2* | 2/2009 | Miyazaki ................ | G10L 15/08 704/231 |
| 7,603,278 B2* | 10/2009 | Fukada ................... | G10L 13/06 345/473 |

(Continued)

*Primary Examiner* — Richemond Dorvil
*Assistant Examiner* — Thuykhanh Le
(74) *Attorney, Agent, or Firm* — Green, Howard & Mughal LLP.

(57) ABSTRACT

Key phrase detection techniques for applications such as wake on voice are discussed include performing a vectorized operation on a multiple element acoustic score vector for a current time instance including a single state rejection model score and scores for a multiple state key phrase model and a multiple element state score vector for a previous time instance including a previous state score for the single state rejection model and previous state scores for the multiple state key phrase model to generate a multiple element score summation vector and a second vectorized operation on the multiple element score summation vector to determine a multiple element state score vector for the current time instance. The multiple element state score vector for the current time instance may then be evaluated to determine whether received audio input includes a key phrase corresponding to the multiple state key phrase model.

25 Claims, 8 Drawing Sheets

(56) References Cited

U.S. PATENT DOCUMENTS

| | | | | |
|---|---|---|---|---|
| 7,720,683 B1* | 5/2010 | Vermeulen | G10L 15/22 | 704/235 |
| 8,255,215 B2* | 8/2012 | Li | G10L 15/02 | 704/235 |
| 8,527,271 B2* | 9/2013 | Wandinger | G10L 15/04 | 704/246 |
| 8,818,802 B2* | 8/2014 | Fastow | G06K 9/00979 | 375/243 |
| 9,299,338 B2* | 3/2016 | Kato | G10L 13/08 | |
| 9,646,613 B2* | 5/2017 | Blouet | G10L 17/22 | |
| 2010/0324900 A1* | 12/2010 | Faifkov | G10L 15/12 | 704/254 |
| 2012/0166194 A1* | 6/2012 | Jung | G10L 15/02 | 704/238 |
| 2014/0025379 A1* | 1/2014 | Ganapathiraju | G10L 15/08 | 704/255 |
| 2014/0058731 A1* | 2/2014 | Tyagi | G10L 15/063 | 704/243 |
| 2014/0079297 A1* | 3/2014 | Tadayon | G06K 9/00 | 382/118 |
| 2014/0172428 A1* | 6/2014 | Han | G10L 17/16 | 704/250 |
| 2014/0337030 A1* | 11/2014 | Lee | G10L 15/08 | 704/251 |
| 2014/0337031 A1* | 11/2014 | Kim | G06F 3/167 | 704/256.5 |
| 2014/0358539 A1* | 12/2014 | Rao | G10L 15/063 | 704/243 |
| 2015/0081296 A1* | 3/2015 | Lee | G10L 15/20 | 704/239 |
| 2015/0279358 A1* | 10/2015 | Kingsbury | G10L 15/083 | 704/257 |
| 2015/0302847 A1* | 10/2015 | Yun | G10L 15/02 | 704/251 |
| 2015/0371631 A1* | 12/2015 | Weinstein | G10L 15/285 | 704/256.4 |
| 2015/0371633 A1* | 12/2015 | Chelba | G10L 15/063 | 704/240 |
| 2016/0071516 A1* | 3/2016 | Lee | G10L 15/18 | 704/251 |
| 2016/0098999 A1* | 4/2016 | Jacob | G10L 19/00 | 704/201 |
| 2016/0111086 A1* | 4/2016 | Ziolko | G10L 15/14 | 704/240 |
| 2016/0180839 A1* | 6/2016 | Tomita | G10L 15/02 | 704/240 |
| 2016/0188573 A1* | 6/2016 | Tang | G06F 17/2775 | 704/9 |
| 2016/0189706 A1* | 6/2016 | Zopf | G10L 15/063 | 713/320 |
| 2016/0379632 A1* | 12/2016 | Hoffmeister | G10L 15/18 | 704/253 |

* cited by examiner

LINEAR SCORING FOR LOW POWER WAKE ON VOICE

BACKGROUND

Wake-on-voice, key phrase detection, or hot word detection systems may be used to detect a word or phrase or the like, which may initiate an activity by a device. For example, the device may wake (e.g., transition from a low power or sleep mode to an active mode) based on the detection of a particular word or phrase.

Current key phrase detection systems may model context-dependent phones of key phrases and may use Gaussian mixture models (GMMs) to model the acoustics of the variations. Such systems may include a model for the key phrase and a model for non-key phrases. However, such models are too complex for implementation in low resource (e.g., compute resource, memory resource, and power resource) environments. Simpler techniques that use less resources such as less power may be used in such low resource environments. However current low resource techniques have problems with robustness (e.g., noise, false accepts, and the like).

As such, existing techniques do not provide high quality low resource key phrase detection. Such problems may become critical as the desire to implement key phrase detection systems such as wake on voice systems becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
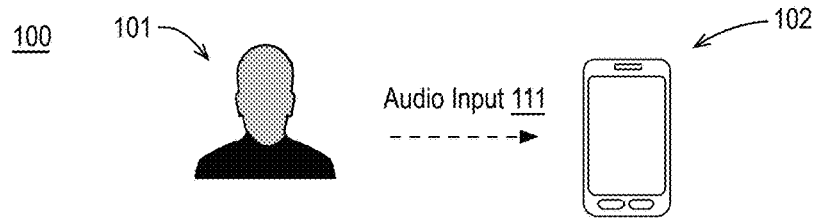
FIG. 1 is an illustrative diagram of an example setting for providing key phrase detection.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors, dedicated hardware, or the like) and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to linear scoring for low power wake on voice.

As described above, key phrase or hot word detection systems may be used to detect a word or phrase or the like, which may initiate an activity by a device such as waking the device from a low power or sleep mode to an active mode based on detection of the key phrase. As used herein, the term key phrase may indicate any audio indicator or acoustic event to be detected such as a phrase, a word, a wake up word, or a group of phones, or an audio or acoustic event such as a baby's cry, a scream, or the like. Furthermore, the key phrase may be predetermined for use by the system such that detection of a predetermined key phrase may be provided. The predetermined key phrase may be predefined (e.g., user independent and predefined by the application) or user-defined (e.g., a user may train the key phrase). As used herein, the term predetermined key phrase includes any such predefined and/or user-defined key phrase(s). In an embodiment, an energy based voice activation detection may detect speech or some form of audio input and key phrase detection as discussed herein may be initiated based on the voice activation detection. Embodiments discussed herein may provide low power or ultra low power wake on voice.

Embodiments discussed herein include linearized scoring procedures key phrase sequence(s) or key phrase model(s) to provide for a vectorized form of scoring. For example, some or all operations may be performed as vectorized operations for increased efficiency, decreased processing time, or the like. Such vectorized scoring may provide for operations applied to entire vectors of scores such as current acoustic scores (e.g., neural network outputs), previous scores of the key phrase models and/or rejection model(s), or the like and to generate entire vectors of output scores for the key phrase models and/or the rejection model(s) as discussed further herein. Such vectorized scoring may provide advantages in terms of computational efficiency and power usage. Furthermore, such vectorized scoring may be optimized via single instruction, multiple data (SIMD) instructions or the like to provide further computational efficiency as well as reduced memory requirements. Also, such vectorized scoring may be implemented via hardware to provide further advantages.

In some embodiments, key phrase detection may include generating a multiple element acoustic score vector for a current time instance based on received audio input. For example, for a current time instance, an acoustic model such as a deep neural network or the like may be scored to generate the multiple element acoustic score vector such that the multiple element acoustic score vector includes a score for a single state rejection model and scores for one or more multiple state key phrase models such that each multiple state key phrase model corresponds to a predetermined key phrase. The multiple element acoustic score vector may be based on the received audio input and generated using any suitable technique or techniques as discussed further herein. A multiple element state score vector for a previous time instance may be received. For example, the multiple element state score vector may be a score vector generated at a previous time instance such that an updated multiple element state score vector is generated or updated over time for continual evaluation for a key phrase. The multiple element state score vector includes a previous state score for the single state rejection model and previous state scores for the multiple state key phrase model.

A vectorized operation is performed to add the multiple element acoustic score vector and the multiple element state score vector to generate a multiple element score summation vector. For example, the vectorized operation may save time, computational resources, and memory resources. The multiple element score summation vector may include elements that are an element by element sum of the multiple element acoustic score vector and the multiple element state score vector. For example, the multiple element score summation vector includes a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model.

A second vectorized operation is then performed to determine a maximum of the rejection state value and a first value of the key phrase model values and subsequent maxima between the first value of the key phrase model values and a second value of the key phrase model values, the second value of the key phrase model values and a third value of the key phrase model values, and so on through a last value of the key phrase model values to generate a multiple element state score vector for the current time instance. Such processing may provide, for each state of the key phrase model, a value that is the maximum between a self-loop for the state (e.g., the summation value for the state of the key phrase model) and a transition to the state from a preceding adjacent state of the key phrase model (e.g., the summation value of the state preceding the state of the key phrase model).

The multiple element state score vector for the current time instance may then be evaluated to determine whether a key phrase has been detected. If a single key phrase model is provided, the current state score for the single state rejection model and a final state score for the multiple state key phrase model may be evaluated to determine whether the received audio input is associated with the predetermined key phrase corresponding to the multiple state key phrase model. The evaluation may be performed using any suitable technique or techniques such as determining a log likelihood score based on the current state score for the single state rejection model and the final state score for the multiple state key phrase model and comparing the log likelihood score to a threshold. If multiple key phrase models are provided, the current state score(s) for the single state rejection model(s) and a maximum final state score of the final state scores for each of the multiple state key phrase models may be evaluated. A single rejection model common for all multiple key phrase models may be used or separate rejection models for each key phrase model may be used. If a key phrase is detected, a system wake indicator or a system command may be provided to wake the device, execute a device command, or the like.

FIG. 1 is an illustrative diagram of an example setting 100 for providing key phrase detection, arranged in accordance with at least some implementations of the present disclosure. As shown in FIG. 1, setting 100 may include a user 101 providing audio input 111 to a device 102. For example, device 102 may be in a deep sleep or power saving mode or the like and user 101 may be attempting to wake device 102 via key phrase detection. If user 101 provides audio input 111 that is identified as the key phrase of device 102, device 102 may wake from a sleep or power saving mode, perform a task, or the like. For example, device 102 may provide an automatic wake on voice capability for user 101. As shown, in some examples, an automatic wake on voice system may be implemented via device 102 such that device 102 may be a smartphone. However, device 102 may be any suitable device such as a computer, a laptop, an ultrabook, a smartphone, a tablet, a phablet, a wearable device such as a smart watch or eye glasses, or the like. In any case, device 102 may be described as a computing device as used herein.

As shown, in some examples, user 101 may provide audio input 111 in an attempt to wake device 102 or the like. As will be appreciated, device 102 may also receive as audio input background noise, silence, background speech, speech not intended to attain access to device 102, and the like. For example, device 102 may need to differentiate or classify audio (e.g., audio input 111 or other audio) that does not match a predetermined key phrase (e.g., as provided by a rejection model as discussed herein) from audio that matches the predetermined key phrase (e.g., as provided by a key phrase model as discussed herein).

Figure 2:
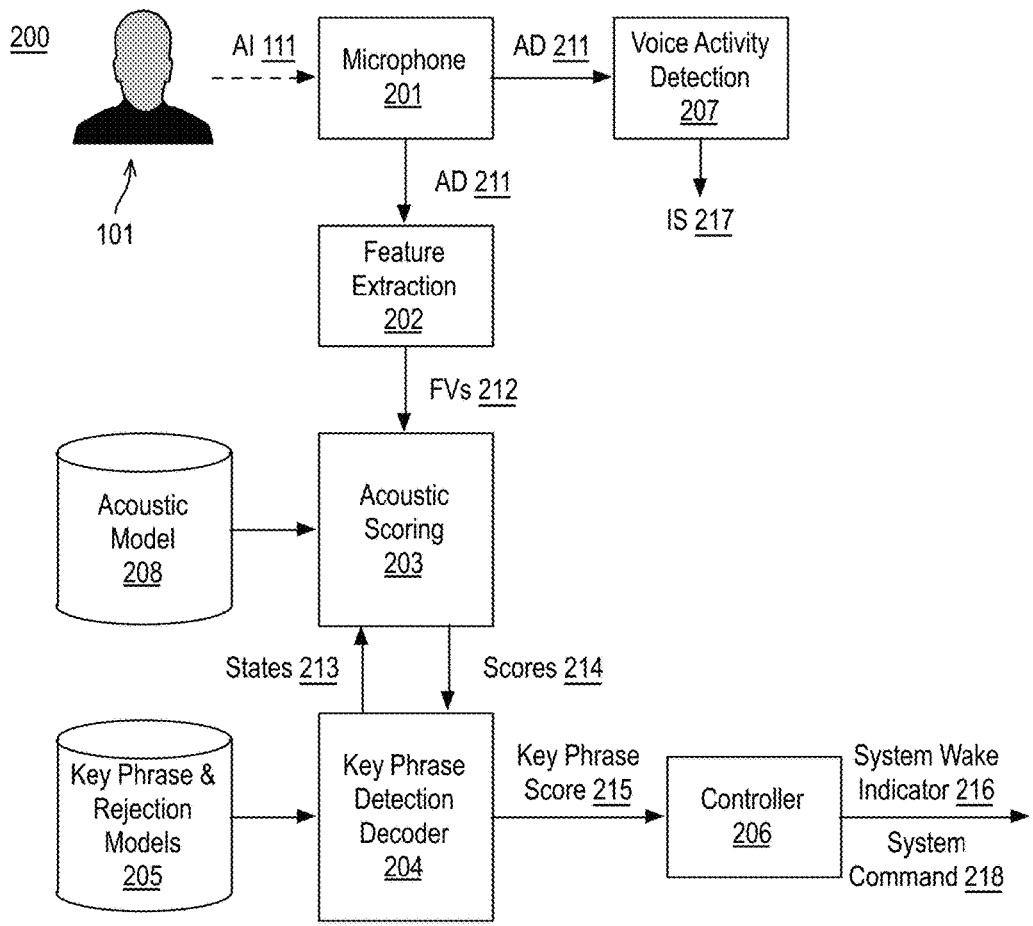
FIG. 2 is an illustrative diagram of an example system for providing key phrase detection.

FIG. 2 is an illustrative diagram of an example system 200 for providing key phrase detection, arranged in accordance with at least some implementations of the present disclosure. As shown in FIG. 2, system 200 may include a microphone 201, a feature extraction module 202, an acoustic scoring module 203, a key phrase detection decoder 204, key phrase and rejection models 205, a controller 206, an acoustic model 208, and a voice activity detection module 207. For example, as shown in FIG. 2, key phrase detection decoder 204 may provide a key phrase score 215 to controller 206. Based on key phrase score 215 (e.g., if key phrase score 215 is greater than a threshold or the like), controller 206 may provide a system wake indicator 216 (e.g., if key phrase score 215 indicates a predetermined key phrase or one of several predetermined key phrase has been matched) or controller 206 may not provide such an indicator and system 200 may continue evaluating input speech for a match. As shown, in some examples, controller 206 may also provide a system command 218 associated with the key phrase to request system 200 to perform an operation such as starting an application, generating or retrieving data, or the like. As is discussed further herein, in some embodiments, feature extraction module 202, acoustic scoring module 203, key phrase detection decoder 204, controller 206, and voice activity detection module 207 may be implemented via a digital signal processor (DSP).

As discussed, in some embodiments, system 200 may implement a single key phrase such that, upon detection of the key phrase, system wake indicator 216 and/or system command 218 may be provided. In other embodiments, system 200 may implement multiple key phrases (based on implementing multiple key phrase models as discussed herein). In such embodiments, if any of the key phrases are detected, system wake indicator 216 and/or system command 218 may be provided. Furthermore, system command 218 may be associated with a particular key phrase of the key phrases. For example, a first wake up command (e.g., key phrase) such as "Computer, Play Music" may wake the device (e.g., via system wake indicator 216) and play music (e.g., via a music play command implemented by system command 218) and a second wake up command (e.g., key phrase) such as "Computer, Do I Have Mail?" may wake the device (e.g., via system wake indicator 216) and determine whether mail has been received (e.g., via a get mail command implemented by system command 218).

As shown, microphone 201 may receive audio input (AI) 111 from user 101 (or multiple users or an environment or the like). In some examples, audio input 111 is issued by user 101 to wake system 200 and/or to have system 200 perform an operation. As discussed, microphone 201 may receive audio input that is not intended to wake system 200 or other background noise or even silence. For example, audio input 111 may include any speech issued by user 101 and any other background noise or silence or the like in the environment of microphone 201. Audio input 111 may be characterized as audio, input audio, an input speech stream, or the like. Microphone 201 may receive audio input 111 and/or other audio (e.g., as sound waves in the air) and convert audio input 111 and/or such other audio to an electrical signal such as a digital signal to generate audio data (AD) 211. For example, audio data 211 may be stored in memory (not shown in FIG. 2), transferred for continued processing, or the like.

As shown, voice activity detection module 207 may receive audio data 211. For example, voice activity detection module 207 may operate (e.g., via a DSP) even in a deep sleep mode of system 200 to continuously monitor audio data 211. Upon detection of a voice or other sound that requires further evaluation by system 200, voice activity detection module 207 may provide initiation signal (IS) 217, which may activate the other modules of system 200 to provide key phrase detection. For example, voice activity detection module 207 may provide initiation signal 217 to feature extraction module 202 to activate feature extraction module 202 and other components of system 200. In an embodiment, a portion of audio data 211 (e.g., 360 ms of audio data or the like) may be buffered by a ring-buffer or the like. When a voice or other sound that requires further evaluation is detected by voice activity detection module 207, feature extraction module 202 may receive the data from the buffer and further incoming audio via audio data 211.

If a predetermined key phrase is detected, as discussed herein, system 200 may enter a higher level mode of operation for user 101. Furthermore, voice activity detection module 207 may operate during key phrase detection (e.g., while a key phrase is not detected or not yet detected) to determine whether system 200 may be put back into a deep sleep mode or the like. For example, voice activity detection module 207 may provide a low power always listening capability for system 200. For example, upon activation by initiation signal 217, audio data 211 may be continuously monitored for key phrase detection until controller 206 determines a key phrase has been detected and system wake indicator 216 is provided or until a determination is made by voice activity detection module 207 to reenter a sleep mode or low power state or the like.

As discussed, feature extraction module 202 may receive audio data 211. For example, feature extraction module 202 may receive audio data 211 from microphone 201, from the discussed buffer, from other memory of system 200, or the like and feature extraction module 202 may generate feature vectors 212 associated with audio input 111. Feature vectors 212 may be any suitable features or feature vectors or the like representing audio input 111. For example, feature vectors 212 may be a time series of feature vectors (e.g., feature vectors each generated for an instance of time) such that each of feature vectors 212 includes a stack of features or feature vectors each from an instance of time such as a sampling time or the like.

Figure 3:
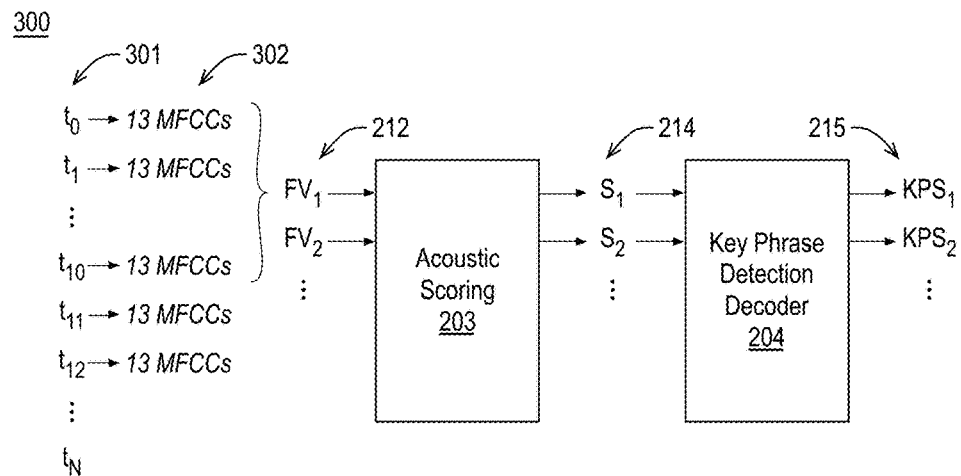
FIG. 3 illustrates example data structures associated with key phrase detection.

FIG. 3 illustrates example data structures 300 associated with key phrase detection, arranged in accordance with at least some implementations of the present disclosure. As shown in FIG. 3, at each of multiple sampling times 301 (e.g., represented as sampling times $t_0, t_1, \ldots, t_N$), sampling coefficients 302 such as Mel frequency cepstrum coefficients (MFCCs) or the like may be generated. Sampling times 301 may be at any suitable interval such as every 10 ms or the like and the sampling performed at each sampling time of sampling times 301 may sample any duration of input speech or audio such as 25 ms of audio or the like. Sampling coefficients 302 may include any number of sampling coefficients such as 13 coefficients as in the illustrated example. Furthermore, sampling coefficients 302 may each be referred to as features, a feature vector, a sampling, or the like. For example, sampling coefficients 302 may be coefficients representing a power spectrum of the received audio. As discussed, in an embodiment, sampling coefficients 302 are Mel frequency cepstrum coefficients representing a power spectrum of the received audio. For example, with reference to FIG. 2, Mel frequency cepstrum coefficients may be determined based on audio input 111 (e.g., via audio data 211) by taking a Fourier transform of audio input 111 and/or audio received via microphone 201, mapping to the Mel scale, determining logs of the powers at each Mel frequency, and determining the Mel frequency cepstrum coefficients based on a discrete cosine transform (DCT) of the logs of the powers.

With continued reference to FIG. 3, sampling coefficients 302 may be stacked or concatenated or combined or the like to generate feature vectors 212. As shown, in an embodiment, 11 instances of sampling coefficients 302 may be combined to generate each feature vector of feature vectors 212. Furthermore, prior to stacking, sampling coefficients 302 may be normalized or the like. For example, Mel frequency cepstrum coefficients may be processed by cepstral mean normalization or the like to generate sampling coefficients 302. As shown, in an embodiment, 11 instances of sampling coefficients 302 may be combined to generate each feature vector such that each feature vector is a 143 (e.g., 11×13) dimensional vector. However, any number of instances of sampling coefficients 302 may be combined or stacked to generate feature vectors 212. As shown, feature vector $FV_1$ may include sampling coefficients associated with times $t_0$-$t_{10}$. Furthermore, feature vector $FV_2$ may include sampling coefficients associated with times $t_1$-$t_{11}$, feature vector $FV_3$ may include sampling coefficients associated with times $t_2$-$t_{12}$, and so on such that adjacent feature vectors have overlap with respect to sampling coefficients 302 that are included therein.

As shown in FIGS. 2 and 3, feature vectors 212 may be provided to acoustic scoring module 203. Acoustic scoring module 203 may score feature vectors 212 based on acoustic model 208 as received via memory and provide any number of output scores 214 based on feature vectors 212. Output scores 214 may be characterized as scores, probabilities, scores of sub-phonetic units, probability density function scores, or the like. For example, acoustic scoring module 203 may generate such output scores or states for each of feature vectors 212 to generate a time series of scores 214 (e.g., represented as scores $S_1$, $S_2$, . . . in FIG. 3). For example, scores 214 may be a time series of scores of sub-phonetic units. In an embodiment, acoustic scoring module 203 receives and implements acoustic model 208 as discussed herein. In an embodiment, acoustic model 208 may be a deep neural network (DNN) pretrained based on a training set of audio. In an embodiment, acoustic model 208 may be a deep neural network having any number of outputs such as 4,000 outputs or the like. In another embodiment, acoustic model 208 is a pruned deep neural network having the number of outputs reduced or pruned such that only a subset of available outputs (e.g., as determined set-up and/or training) are provided or activated. Such required outputs may be provided by states signal 213 or such required outputs may be preset or pretrained prior to implementation.

For example, the outputs of acoustic scoring module 203 (e.g., scores 214) may represent sub-phonetic units such as tied context-dependent triphone states. Such tied context-dependent triphone states may represent monophones tied to monophones on either side (e.g., left and right) to generate tied context-dependent triphones. A language, for example, may have a number of monophones (e.g., 30-50 monophones) and sub-phonetic units such as exemplary tied context-dependent triphone states may include each of such monophones in a variety of contexts such that various other monophones are before and after such monophones to generate many combinations (e.g., the sub-phonetic units). Acoustic scoring module 203 may, based on feature vectors 212, provide probabilities or scores or the like associated with such sub-phonetic units (e.g., probabilities or scores as to which unit or phone has been spoken) as well as probabilities or scores associated with silence and/or background noise or the like at its outputs. As shown in FIG. 3 and as discussed further herein, for each or some of scores 214, key phrase detection decoder 204 may generate a corresponding key phrase score 215 (e.g., represented as key phrase scores $KPS_1$, $KPS_2$, . . . ). In the example of FIG. 3, a key phrase score 215 is generated at each time instance as associated with scores 214. In other examples, a key phrase score 215 may be generated at less frequent time intervals. As discussed further herein, in generating key phrase score 215, key phrase detection decoder 204 may implement vectorized operations on score vectors.

Furthermore, as discussed, in some embodiments, a single key phrase may be detected and a system may be woken (e.g., via system wake indicator 216) and an optional command may be issued (e.g., via system command 218) based on the detected key phrase. In other embodiments, a second or additional key phrases may be implemented and associated key phrase models may be evaluated by key phrase detection decoder 204. For example, such key phrase models may be evaluated and associated key phrase scores may be evaluate to determine whether a particular key phrase of multiple key phrases has been detected. For example, as discussed further herein, multiple key phrase models may be provided. In the context of FIG. 3, key phrase detection decoder 204 may generate a key phrase score or scores for each of such key phrase models (and at multiple time instances) for evaluation by controller 206.

Figure 4:
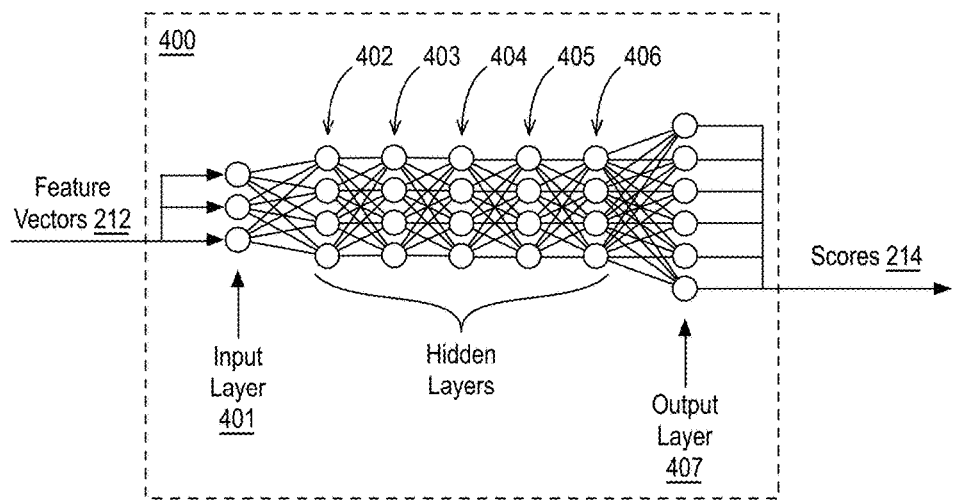
FIG. 4 illustrates an example acoustic model neural network.

FIG. 4 illustrates an example acoustic model neural network 400, arranged in accordance with at least some implementations of the present disclosure. For example, neural network 400 may be implemented as acoustic scoring module 203 in some embodiments. Neural network 400 may include any suitable neural network such as an artificial neural network, a deep neural network, a convolutional neural network, or the like. As shown in FIG. 4, neural network 400 may include an input layer 401, hidden layers 402-406, and an output layer 407. Neural network 400 is illustrated as having three input nodes, hidden layers with four nodes each, and six output nodes for the sake of clarity of presentation, however, neural network 400 may include any such input, hidden, and output nodes. Input layer 401 may include any suitable number of nodes such as a number of nodes equal to the number of elements in each of feature vectors 212. For example, input layer 401 may have 143 nodes corresponding to each of the 143 dimensions of feature vectors 212. In other examples, feature vectors may have fewer or more elements or dimensions and input layer 401 may have a corresponding number of nodes.

Furthermore, as in the illustrated example, neural network 400 may include five hidden layers 402-406. However, neural network 400 may include any number of hidden layers. Hidden layers 402-406 may include any number of nodes. For example, hidden layers 402-406 may include 1,500 to 2,000 nodes, 2,000 to 2,500 nodes, or the like. In some examples, hidden layers 402-406 have the same number of nodes and, in other examples, one or more layers may have different numbers of nodes. Output layer 407 may include any suitable number of nodes such that scores 214 include values corresponding to tied context-dependent triphone states or the like. In some examples, neural network 400 may implement Hidden Markov Models (HMMs). As discussed, in some embodiments, output layer 407 may be pruned such that only predetermined output nodes (and associated scores 214) are provided such that a subset of available states or scores are implemented via neural network 400.

Returning to FIG. 2, as discussed, scores 214 from acoustic scoring module 203 may be provided to key phrase detection decoder 204. Also, as shown, key phrase detection decoder 204 may also receive and implement a key phrase model (or multiple key phrase models) and a rejection model. For example, key phrase detection decoder 204 may receive a key phrase model (or multiple key phrase models) and a rejection model (e.g., key phrase and rejection models 205) from memory. For example, key phrase detection decoder 204 may receive and implement any rejection and key phrase models discussed herein.

Figure 5:
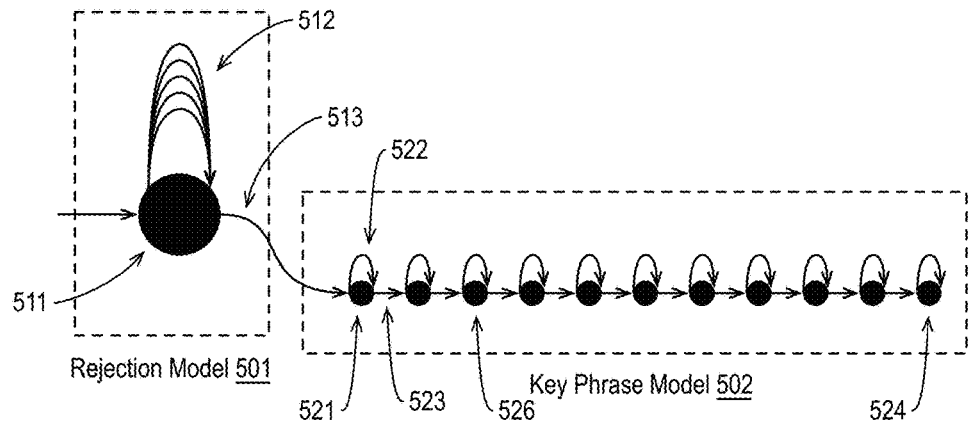
FIG. 5 illustrates an example rejection model and an example key phrase model.

FIG. 5 illustrates an example rejection model 501 and an example key phrase model 502, arranged in accordance with at least some implementations of the present disclosure. As shown in FIG. 5, rejection model 501 may include a single state 511 and multiple self loops 512. For example, single state 511 may correspond to a start state and may provide a single start state based rejection model. Furthermore, each of self loops 512 may be associated with one of scores 214 (e.g., an output from acoustic scoring module 203) such that self loops 512 provide self updates or summing or the like for single state 511 of rejection model 501. For example, each of self loops 512 may be associated with a deep neural network output or output node that corresponds to a sub-phonetic unit or a silence. Using such techniques, for example, single state 511 may provide a start state that implements a rejection model. Self loops 512 may include any number of self loops. For example, at each time instance of outputs from acoustic scoring module 203, rejection model 501 may be updated to provide a rejection likelihood score associated therewith. For example, self loops 512 may illustrate updates to single state 511 at each time instance of outputs (e.g., scores 214) from acoustic scoring module 203.

Also as shown in FIG. 5, key phrase model 502 may be subsequent to rejection model 501 and connected by transition 513. Key phrase model 502 may include multiple states (or nodes) 526 interconnected by transitions 523. As shown, states 526 may include an initial state 521 and a final state 524 such that transition 513 connects key phrase model 502 to initial state 521 and transitions 523 interconnect subsequent states 526 including final state 524. Each of states 526 may include or be updated by one or more self loops such as self loop 522 and each of states 526 may be updated based on a transition of transitions 523 or transition 513 from a prior state in key phrase model 502 or from rejection model 501. For example, each self loop 522 (or arc) may be associated with or correspond to an output (e.g., a score of scores 214) from acoustic scoring module 203. In the illustrated example, each of states 526 has a single self loop 522. However, one or more of states 526 may include multiple self loops. In some examples, one or more of states 526 may be silence states having self loops representative of silence such that key phrases may be modeled that include silence. In some examples, one or more of states 526 may have both non-silence and silence self loops. Key phrase model 502 may include any suitable model. For example, key phrase model 502 may be selected based on the predetermined key phrase implemented via system 200 and key phrase model 502 may be selected based on a lexicon look up. For example, transitions 523 between states 526 may be selected based on the triphone-HMM-state sequence in the lexicon. In some contexts, key phrase model 502 may be characterized as a key phrase sequence or the like.

Based on rejection model 501 and key phrase model 502, at each or some time instances, a rejection likelihood score and a key phrase likelihood score may be determined. For example, the rejection likelihood score may be a score associated with single state 511 of rejection model 501 and the key phrase likelihood score may be associated with final state 524 of states 521 of key phrase model 502. For example, rejection model 501 and key phrase model 502 may be initialized with all nodes or states thereof at null or negative infinity or the like. With reference to FIGS. 2 and 5, based on a first feature vector $FV_1$, acoustic scoring module 203 may generate scores $S_1$, and single state 511 of rejection model 501 and a first state of key phrase model 502 may be updated. Upon a second feature vector $FV_2$ being processed, acoustic scoring module 203 may generate scores $S_2$, and single state 511 of rejection model 501 and a first and second state of key phrase model 502 may be updated. Such processing may continue until final state 524 is updated from its initialization state to a meaningful scoring. At such a time instance (and subsequent time instances as updates continue), the score or probability or the like of single state 511 and the score or probability or the like of final state 524 may be used to determine whether the predetermined key phrase has been detected. For example, a time series of key phrase scores 215 may be generated by key phrase detection decoder 204 based on scores 214, rejection model 501, and key phrase model 502.

Key phrase scores 215 may include any suitable key phrase score that compares the likelihood generated at single state 511 with the likelihood generated at final state 524. In an embodiment, a key phrase score of key phrase scores 215 may be a log likelihood ratio. For example, a key phrase score of key phrase scores 215 may be determined as shown in Equation (1):

$$KPS = \log(p(X|KeyPhrase)) - \log(p(X|Reject)) \quad (1)$$

where KPS may be the key phrase score, X may be the current accumulation of feature vectors being evaluated, and p provides a probability X is a member of KeyPhrase or Reject.

Returning to FIG. 2, as shown, controller 206 may receive key phrase score 215 (e.g., a time series of key phrase scores) and controller 206 may compare key phrase score 215 to a threshold or the like to determine whether the predetermined key phrase has been detected. For example, if key phrase score 215 is greater than (or greater than or equal to) the threshold, the predetermined key phrase has been detected and controller 206 may provide system wake indicator 216 to wake system 200. If key phrase score 215 is less than (or less than or equal to) the threshold, the predetermined key phrase has not been detected and controller 206 may not provide system wake indicator 216 and controller may continue to monitor key phrase score 215.

As discussed herein and as shown in FIG. 5, in some embodiments, a single key phrase model 502 may be implemented (e.g., for a single key phrase). In other embodiments, multiple key phrase models (e.g., each associated with a different key phrase or a variation of the same key phrase or both) may be implemented. For example, each of the multiple key phrase models may be subsequent to rejection model 501 and connected to rejection model 501 by a transition in analogy to key phrase model 502 being connected to rejection model 501 by transition 513. In some embodiments, each of multiple phrase models may be associated with a separate instance of rejection model 501. Furthermore, as discussed with respect to key phrase model 502, each of the multiple key phrase models may include multiple states (or nodes) interconnected by transitions and each of the states may include or be updated by one or more self loop such that the states may be updated based on a transition from a prior state in the key phrase model (or the transition from rejection model 501). As discussed, each self loop may be associated with an output (e.g., a score) from acoustic scoring module 203.

Returning to FIG. 2, controller 206 may receive such key phrase scores (e.g., a time series of key phrase scores) and controller 206 may compare such key phrase scores to a threshold or respective thresholds to determine whether any of the predetermined key phrases have been detected. For example, if any of the key phrase scores is greater than (or greater than or equal to) the threshold or its respective threshold, a particular predetermined key phrase has been detected and controller 206 may provide system wake indicator 216 to wake system 200 and an optional command indicator (e.g., system command 218) to perform a command associated with the particular predetermined key phrase. If all of the key phrase scores are less than (or less than or equal to) the threshold or their respective thresholds, controller 206 may not provide system wake indicator 216 and controller may continue monitoring for a predetermined key phrase.

With reference now to FIG. 5, as shown, states 526 of key phrase model 502 may have the same structure such that each of states 526 has one ingoing transition, one outgoing transition (except for final state 524), and one self loop transition such that both the ingoing transition and the self loop are updated with the same score of scores 214. Furthermore, rejection model 501 is separate from key phrase model 502 such that the rejection score corresponding to rejection model 501 may be determined separately from the scores of states 526 of key phrase model 502. Also, as discussed, optional silences may be added to key phrase model 502 by adding self loops to any of states 526 of key phrase model 502. Further still, optional transitions to rejection model 501 (as illustrated with respect to FIG. 8) may be treated as separate loops. Finally, multiple (e.g., parallel) key phrase models (as illustrated with respect to FIG. 9) may be provided in a single score-array (e.g., vector) with optional spare states therebetween for discrimination between them.

Figure 6:
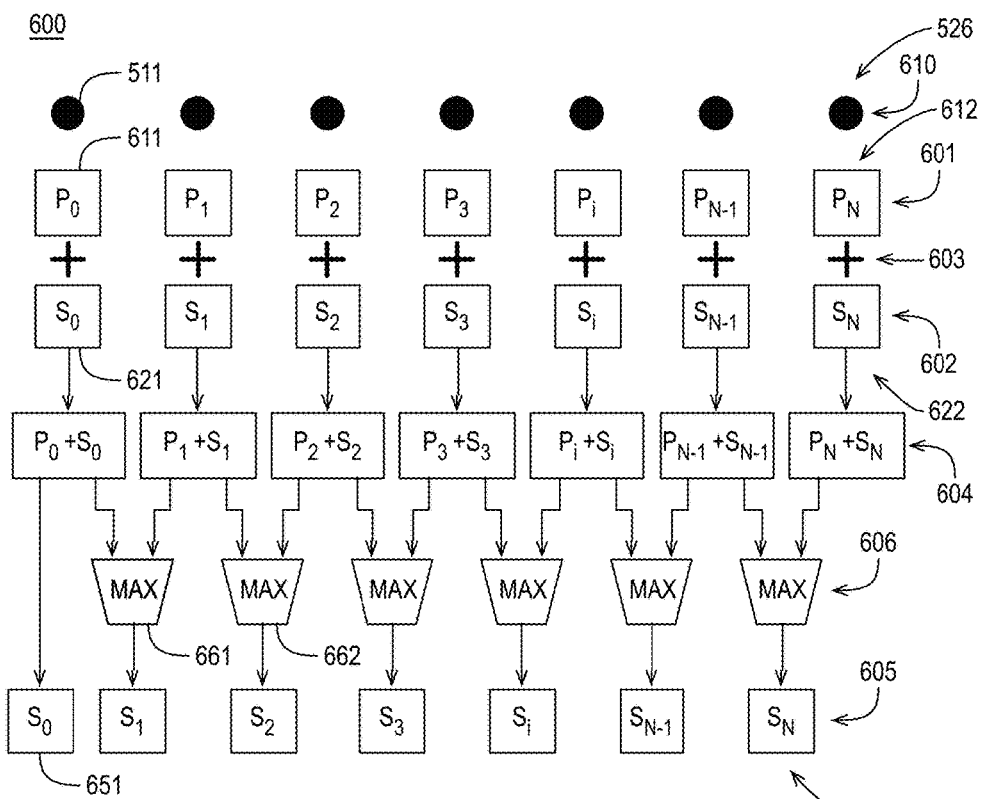
FIG. 6 illustrates example data structures for updating states of a rejection model and one or more key phrase models.

FIG. 6 illustrates example data structures 600 for updating states of a rejection model and one or more key phrase models, arranged in accordance with at least some implementations of the present disclosure. As shown in FIG. 6, for nodes 610 (or states) corresponding to rejection model 501 and key phrase model 502 (and additional key phrase models, if used), vector processing or vectorized operations may be performed to update the states corresponding to nodes 610 of the models at various time iterations to generate a multiple element state score vector 605 for a current time instance having a current state score 651 for single state rejection model 501 (i.e., score $S_0$) and current scores 652 for multiple state key phrase model 502 or additional models, if used (i.e., scores $S_1, S_2, S_3, \ldots, S_i, \ldots, S_{N-1}, S_N$).

For example, for a current time instance, a multiple element acoustic score vector 601 may be generated. As shown, multiple element acoustic score vector 601 may include a current score 611 for single state rejection model 501 (i.e., score $P_0$) and current scores 612 for multiple state key phrase model 502 or additional models, if used (i.e., scores $P_1, P_2, P_3, \ldots, P_i, \ldots, P_{N-1}, P_N$). Multiple element acoustic score vector 601 may be generated using any suitable technique or techniques. In an embodiment, multiple element acoustic score vector 610 includes scores 214 from acoustic scoring module 203 as discussed herein. For example, multiple element acoustic score vector 610 may be generated based on audio input 111 as discussed herein.

Also as shown, for a previous time instance, a multiple element state score vector 602 may be received (e.g., from memory based on a previously completed iteration). As shown, multiple element state score vector 602 may include a previous score 621 for single state rejection model 501 (i.e., score $S_0$) and previous scores 622 for multiple state key phrase model 502 or additional models, if used (i.e., scores $S_1, S_2, S_3, \ldots, S_i, \ldots, S_{N-1}, S_N$). Multiple element state score vector 602 may be generated, as discussed, using the described techniques at a previous iteration.

As shown, a vectorized operation 603 is performed on multiple element acoustic score vector 601 (e.g., at a current iteration) and multiple element state score vector 602 (e.g., from a previous iteration) to sum, on an element by element basis, multiple element acoustic score vector 601 and multiple element state score vector 602 to generate multiple element score summation vector 604. For example, vectorized operation 603 may sum multiple element acoustic score vector 601 and multiple element state score vector 602 using array programming, based on SIMD instructions, or in a hardware implementation such that the element by element sums are performed simultaneously, substantially simultaneously, in parallel, or the like. As shown, multiple element score summation vector 604 may include a rejection state value (labeled $P_0+S_0$) corresponding to a sum of the score for the single state rejection model and the previous state score for the single state rejection model followed by subsequent key phrase model values (labeled $P_1+S_1, P_2+S_2, P_3+S_3, \ldots, P_i+S_i, P_{N-1}+S_{N-1}, P_N+S_N$) corresponding to sums of scores for the multiple state key phrase model and previous state scores for the multiple state key phrase model.

Based on multiple element score summation vector 604, multiple element state score vector 605 for the current time instance may be determined such that multiple element state score vector 605 includes a current state score 651 for single state rejection model 501 (i.e., score $S_0$) and current scores 652 for multiple state key phrase model 502 or additional models, if used (i.e., scores $S_1, S_2, S_3, \ldots, S_i, \ldots, S_{N-1}, S_N$). Multiple element state score vector 605 may be generated based on multiple element score summation vector 604 using any suitable technique or techniques such as those discussed further herein.

Multiple element state score vector 605 may then be used to evaluate audio input 111 at the current time instance. For example, current state score 651 for single state rejection model 501 may be compared to a final state score corresponding to, for example, final state 524 of key phrase model 502 to determine whether the key phrase corresponding to key phrase model 502 has been detected. Such a comparison may be made using any suitable technique or techniques such as a difference, a log likelihood ratio as discussed with respect to Equation (1), or the like.

As discussed, multiple element state score vector 605 for the current time instance may be determined using any suitable technique or techniques. As shown, in an embodiment, a vectorized operation 606 may be performed on multiple element score summation vector 604 to generate multiple element state score vector 605. For example, vectorized operation 604 may determine a maximum between adjacent elements (e.g., pairs of elements) of multiple element score summation vector 604 to generate multiple element state score vector 605. For example, vectorized operation 604 may determine a maximum between the rejection state value (labeled $P_0+S_0$) and a first of key phrase model values (labeled $P_1+S_1$) at operator 661, a maximum between the first of key phrase model values (labeled $P_1+S_1$) and a second of key phrase model values (labeled $P_2+S_2$) at operator 662, and so on through a last of key phrase model values (labeled $P_N+S_N$).

Using such techniques, and with reference to FIG. 5, for each state 526 of key phrase model 502, multiple element state score vector 605 may include the maximum of (i.e., greater of) the incoming transition to the state and the self loop of the state. For example, with reference to state 521 and the first of current scores 652, which may correspond to one another, operator 661 provides a maximum of transition 513 to state 521 and self loop 522 of state 521. For example, transition 513 is provided by the previous state score of single state 511 of rejection model 501 (i.e., $S_0$) plus the current acoustic score of single state 511 of rejection model 501 (i.e., $P_0$) and self loop 522 is provided by the previous state score of state 521 (i.e., $S_1$) plus the current acoustic score of state 521 (i.e., $P_1$). Therefore, operator 661 provides, for state 521, the maximum of transition 513 (i.e., $P_0+S_0$) and self loop 522 (i.e., $P_1+S_1$) for score $S_1$ of multiple element state score vector 605. In analogy, each state 526 of key phrase model may be provided with a maximum of the incoming transition to the state and the self loop of the state. Furthermore, current state score 651 for single state rejection model 501 (i.e., score $S_0$) is provided by the greatest score of self loops 512 plus the previous state score for single state 511 (i.e., $P_0+S_0$).

The operations discussed with respect to data structures 600 and FIG. 6 may be repeated any number of times $t_0$ provide updates to rejection model 501 and key phrase model 502 via multiple element state score vector 605 and evaluations of single state 511 and a final state or states of the key phrase models may be similarly repeated to determine if a key phrase corresponding to any of the key phrase models has been detected. Furthermore, as is discussed further herein, data structures 600 may support backward transition(s) to rejection model 501 and/or multiple key word models (or sequences).

Figure 7:
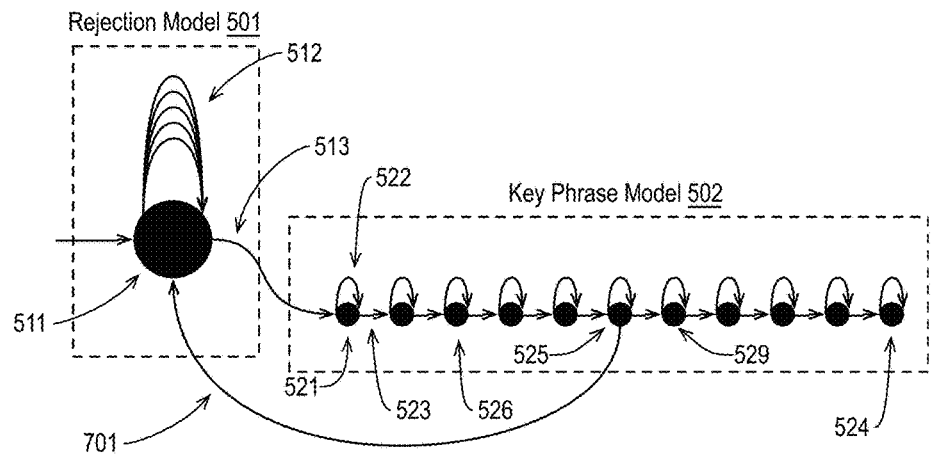
FIG. 7 illustrates an example rejection model and an example key phrase model including a backward transition.

FIG. 7 illustrates an example rejection model 501 and an example key phrase model 502 including a backward transition 701, arranged in accordance with at least some implementations of the present disclosure. For example, rejection model 501 and key phrase model 502 may include any characteristics as discussed herein. Furthermore, key phrase model 502 may include a backward transition 701 (or transitions) that transitions from state 525 to rejection state 511 of rejection model 501. Backward transition 701 may provide for a reduction or elimination of the difference between the score at rejection state 511 (e.g., via backward transition 701) and the score subsequent to state 525. Backward transition 701 may be characterized as a rejection loopback, a rejection transition, a loopback to a rejection model, or the like. When both state 529 and rejection state 511 use the transitioned score from state 525, the difference between the scores of the states may be reduced or eliminated. Such techniques may provide for the requirement that the first part of a key phrase is uttered and for the requirement that the second part of the key phrase is also uttered. Without backward transition 701, in some examples, key phrase model 502 may provide a high probability or score for utterances where the first part matches the key phrase. When the second part of the utterance is incorrect, the scoring of rejection state 511 of rejection model 501 may not recover with respect to the continued scoring of states 526 of key phrase model 502 up to final state 524 (e.g., a scoring state). For example, rejection model 501 may not score high enough or recover and the uttered phrase may be falsely accepted. Such problems may be prevalent when the key phrase has parts of equal length (e.g., "Hello Dragon") or where the first part of the key phrase is longer than the second part (e.g., "Good-morning Dragon" such that good-morning may be hyphenated as it is spoken without pause and may be regarded as one word for detection purposes). The provision of backward transition may eliminate or reduce such false accepts.

Figure 8:
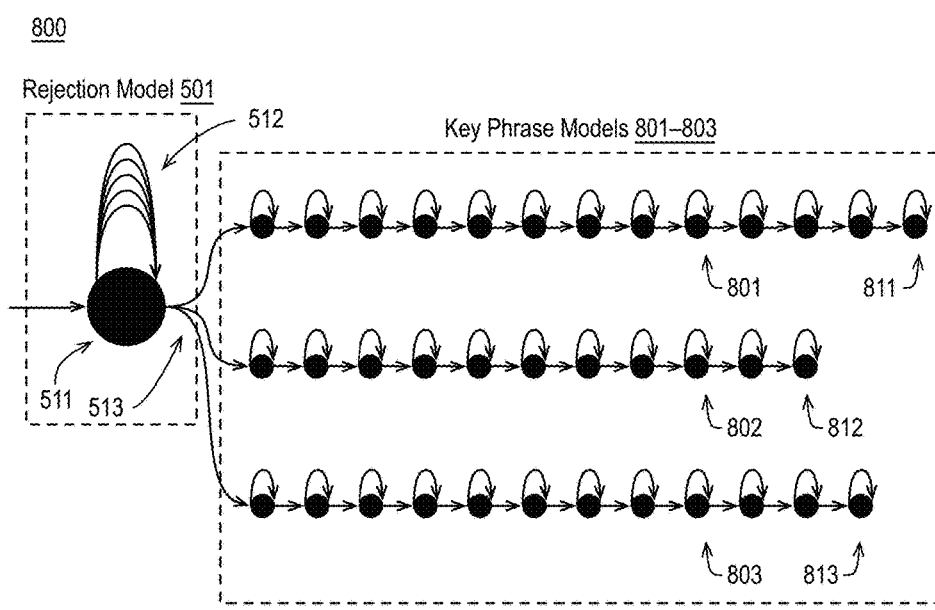
FIG. 8 illustrates an example key phrase recognition model having a single state rejection model and multiple example key phrase models.

FIG. 8 illustrates an example key phrase recognition model 800 having a single state rejection model 501 and multiple example key phrase models 801, 802, 803, arranged in accordance with at least some implementations of the present disclosure. As shown, in an embodiment, key phrase models 801, 802, 803 may have independent final states 811, 812, 813. Such implementations may have the advantage of separately detecting phrases with the added complexity of tracking multiple scores. For example, key phrase recognition model 800 may be provided for implementation to perform key phrase detection such that each of key phrase models 801, 802, 803 may correspond to the same user defined key phrase uttered multiple times by user 101. Although key phrase recognition model 800 includes three key phrase models 801, 802, 803, any number may be provided such as two key phrase models, four key phrase models, or the like. Key phrase models 801, 802, 803 may have any characteristics as discussed herein with respect to key phrase model 502. Furthermore, one or more of key phrase models 801, 802, 803 may include backward transition as discussed with respect to backward transition 701 of FIG. 7.

Figure 9:
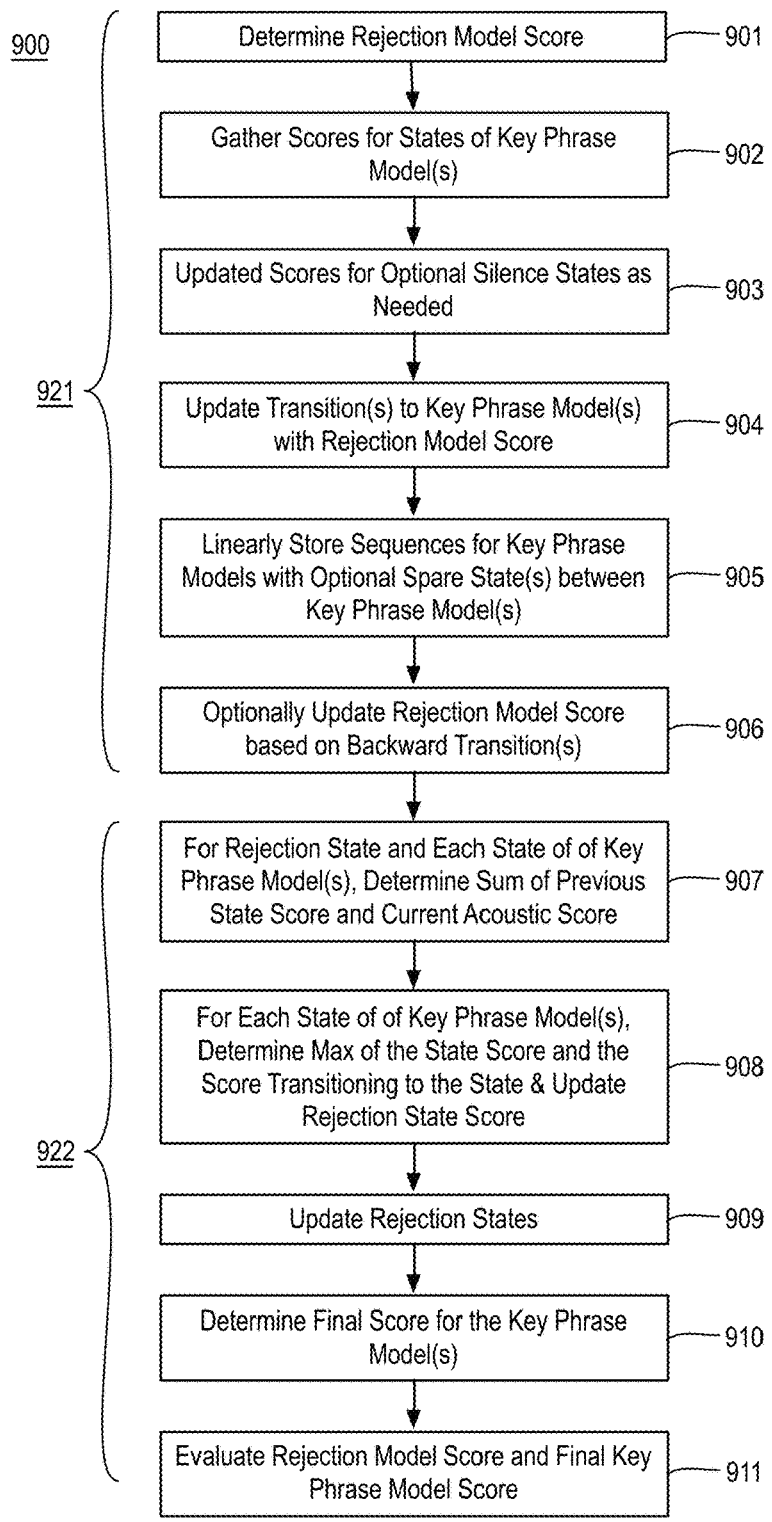
FIG. 9 illustrates an example process for key phrase detection.

FIG. 9 illustrates an example process 900 for key phrase detection, arranged in accordance with at least some implementations of the present disclosure. Process 900 may include one or more operations 901-911 as illustrated in FIG. 9. Process 900 or portions thereof may be performed by any device or system or the like discussed herein to provide key phrase detection. Process 900 or portions thereof may be repeated any number of times to provide key phrase detection via a device or system.

Furthermore, process 900 will be discussed with respect to Pseudo Code 1, which may be utilized to implement at least portions of process 900.

Pseudo Code 1

```
int ScorePhraseModel( )
{
    // Get the Maximum Rejection Score
    int rej_pdf_score = MAX(best_rejection_score, best_silence_score);
    // Gather Key Phrase Model State Acoustic Scores
```

-continued

Pseudo Code 1

```
    FOR (state_idx FROM 1 TO (num_states - 1)):
        state_pdf_scores[state_idx] = dnn_scores(transitions[state_idx]);
    // Update Acoustic Scores for Optional Silence Nodes
    FOR state_idx IN OPT_SILENCE_STATES:
        state_pdf_scores[state_idx] = MAX(state_pdf_scores[state_idx],
            best_silence_score);
    // Update Transitions to Key Phrase Models with Rejection Acoustic Score
    FOR state_idx IN initial_states_idx_table:
        state_pdf_scores[state_idx] = rej_pdf_score;
    // Spare States between Consecutive Key Phrases
    FOR sequence_idx IN SEQUENCES:
        int spare_state_id = phrase_model.FINAL_STATES[sequence_idx - 1] +
            1;
        state_scores[spare_state_id] = INIT_SCORE;
        state_pdf_scores[spare_state_id] = 0;
    // Allow Transitions to Rejection Model
    int new_rejection_state_score = INIT_SCORE;
    FOR state_idx IN TRANS_TO_0_STATES:
        new_rejection_state_score = MAX(rejection_state_score,
            CalcScore(state_scores[state_idx], best_rejection_score);
    // Vectorized Addition
    FOR (state_idx FROM (num_states) TO 0):
        state_scores[state_idx] = CalcScore(state_scores [state_idx],
            state_pdf_scores[state_idx]);
    // Vectorized Maxima & Update Rejection State
    int_max_score = INIT_SCORE;
    FOR (state_idx FROM (num_states) TO 1):
        state_scores[state_idx] = MAX(state_scores[state_idx],
            state_scores[state_idx-1]);
        max_score = MAX(max_score, state_scores[state_idx]); // needed for
            score normalization of next frame
        new_rejection_state_score = MAX(state_scores[0], new_rejection_state_score);
    // Update all Rejection States including 0 State
    FOR (state_idx IN initial_states_idx_table):
        state_scores[state_idx] = new_rejection_state_score;
    // Prepare for Score Normalization for Next Frame
    max_score = MAX(max_score, state_scores[0]);
    // Determine Final Score for Key Phrase Models by Taking Best Final Score
    final_score = INIT_SCORE;
    FOR (state_idx IN phrase_model.FINAL_STATES)
    {
        final_score = MAX(final_score, state_scores[state_idx]);
    }
    // Determine Difference Between Rejection Score and Final Score of Key Phrase Model
    final_score -= state_scores[0];
    // Return Normalized Score
    final_score;
}
```

As shown in FIG. 9, processing may begin at operation 901, where a rejection model score may be determined for the rejection model. For example, a rejection score may be determined for rejection model 501. The rejection model score may be determined using any suitable technique or techniques. In an embodiment, rejection model score may be a maximum of a best rejection score corresponding to the single rejection model (e.g., self loops of the model) and a best silence score corresponding to the single rejection model. For example, with respect to Pseudo Code 1, operation 701 may correspond to "Get the Maximum Rejection Score" such that rej_pdf_score is the rejection score, MAX returns a maximum of its arguments, best_rejection_score is a best rejection score from self loops of the rejection model, and best_silence_score is a best silence score at the current time instance. For example, with respect to FIG. 6, operation 901 may provide current score 611 for single state rejection model 511 of multiple element acoustic score vector 601.

Processing may continue at operation 902, where scores may be gathered for the key phrase model or models. For example, scores may be gathered for key phrase model 502 or key phrase models 801, 802, 803 or the like. The scores may be gathered using any suitable technique or techniques. In an embodiment, scores 214 are gathered from acoustic scoring model and stored in memory. For example, with respect to Pseudo Code 1, operation 902 may correspond to "Gather Key Phrase Model State Scores" such that state_idx is an index value for states of the key phrase model(s), num_states is the total number of states of the key phrase models, and state_pdf_scores[state_idx] stores the score accessed from a deep neural network by dnn_scores(transitions[state_idx]). For example, with respect to FIG. 6, operation 902 may provide current scores 612 for multiple state key phrase model 502 or multiple state key phrase models 801, 802, 803 or the like of multiple element acoustic score vector 601.

Processing may continue at operation 903, where scores for optional silence states of the key phrase model may be updated. The silence states may be updated using any suitable technique or techniques. For example, for a silence state of a key phrase model, a score for the multiple state key phrase model corresponding to the silence state may be updated with a best silence score when the best silence score is greater than a current acoustic score of the silence state.

For example, with respect to Pseudo Code 1, operation 903 may correspond to "Update Scores for Optional Silence Nodes" such that for state_idx that are a member of OPT_SILENCE_STATES, the state score, state_pdf_scores [state_idx], is updated to a maximum (MAX) of the state_pdf_scores[state_idx] (score determined at operation 902) and the best silence score (best silence score). For example, with respect to FIGS. 5 and 6, if the node of key phrase model 502 corresponding to state score $S_i$ of multiple element state score vector 602 is a silence node, the state score $S_i$ may be updated with a silence score if the silence score is greater than the score determined for state score $S_i$ at operation 902.

Processing may continue at operation 904, where transitions to key phrase models may be updated with the rejection scores. For example, transitions from rejection model 501 such as transitions 513 may be updated with the rejection score determined at operation 901. The transitions may be updated using any suitable technique or techniques. For example, with respect to Pseudo Code 1, operation 904 may correspond to "Update Transitions to Key Phrase Models with Rejection Score" such that for state_idx that are a member of initial states idx table (e.g., the state is an initial state of a key phrase model), the state score is set to rej_pdf_score.

Processing may continue at operation 905, where sequences for key phrase models may be linearly stored with optional spare states between the key phrase models. For example, when multiple key phrase models are used, the states of the key phrase models determined as described above may be stored in a linear array or vector or the like. In an embodiment, a spare state may be provided between the key phrase models. For example, with respect to Pseudo Code 1, operation 905 may include or correspond to "Spare States between Consecutive Key Phrases" such that for sequence_idx that are members of SEQUENCES, a spare state is inserted in the phrase_model after the FINAL_STATE of the phrase_model and the scores of such spare states are set to zero. For example, with respect to FIG. 6, as discussed, multiple element acoustic score vector 601, multiple element state score vector 602, and multiple element score summation vector 604 may include or represent multiple key phrase models such as key phrase models 801, 802, 803. In an embodiment, multiple element acoustic score vector 601, multiple element state score vector 602, and multiple element score summation vector 604 may include spare states between the key phrase models. Furthermore, as discussed, at operation 905, multiple element acoustic score vector 601 may be stored as a linear array, vector or the like.

Processing may continue at operation 906, where the rejection model score may be optionally updated based on one or more backward transitions, loopback transitions, transitions to rejection state, or the like. For example, the rejection score for single state rejection model 501 may be updated based on transitions to single state 511 such as transition 701 or the like. For example, for transition 701, a new rejection score may be determined as the state score for state 525 plus the best rejection score for single state 511 determined at operation 901. As will be discussed with respect to operation 908, if the new rejection score from transition 701 is greater than the score single state 511, the new rejection score will replace it. For example, with respect to Pseudo Code 1, operation 906 may correspond to "Allow Transitions to Rejection Model" such that a new_rejection_state_score is initialized and, for any state_idx that is a member of TRANS_TO_0_STATES (i.e., a node that provides a transition to the rejection model), the new_rejection_state_score is determined as a maximum of the rejection state score determined at operation 901 and a sum (as provided by CalcScore) of the state score for the transitioning state and the rejection score determined at operation 901.

As shown in FIG. 9, operations 901-906 may provide a preparation phase for execution phase 922 that may include vectorized operations as discussed with respect to operations 907 and 908.

Processing may continue at operation 907, where, for the rejection model and each state of the key phrase model or models, a vectorized operation may be performed to determine a sum of a previous state score for the state and the current acoustic score. For example, multiple element acoustic score vector 601 may be summed, based on vectorized operation 603, with multiple element state score vector 602 to generate multiple element score summation vector 604. The vectorized operation may be performed using any suitable technique or techniques. For example, the vectorized summing operation may be performed using array programming, based on SIMD instructions, or in a hardware implementation such that the element by element sums are performed simultaneously, substantially simultaneously, in parallel, or the like. For example, with respect to Pseudo Code 1, operation 907 may correspond to "Vectorized Addition" such that for state_idx from num_states to 0 (e.g., for all states including the rejection state), the state scores are updated by summing (as provided by CalcScore) state_scores (i.e., the previous state scores) and state_pdf_scores (i.e., current acoustic scores). For example, with respect to FIG. 6, operation 907 may provide, as discussed, for summing multiple element acoustic score vector 601 and multiple element state score vector 602 to generate multiple element score summation vector 604.

Processing may continue at operation 908, where, for each state of the key phrase model or models, a vectorized operation may be performed to determine a maximum of the state score for the state and the state score transition to the state. For example, max operations may be applied to adjacent values or elements of multiple element score summation vector 604 to determine the maximum of the state score and the transition score. The vectorized operation may be performed using any suitable technique or techniques. For example, the vectorized maximum operation may be performed using array programming, based on SIMD instructions, or in a hardware implementation such that the element by element sums are performed simultaneously, substantially simultaneously, in parallel, or the like. Furthermore, at operation 908, the rejection state score may be updated as maximum of the rejection state score of the rejection model or the score of the state or states transitioning to the rejection model. For example, with respect to Pseudo Code 1, operation 908 may correspond to "Vectorized Maxima & Update Rejection State" such that for state_idx from num_states to 1 (e.g., for all states except the rejection state), the state scores are updated by determining a MAX of state_scores (i.e., current scores as just updated at operation 907) at the indexed state (state_idx) and state_scores at the state transition to the indexed state (i.e., state_idx-1). Furthermore, the new_rejection_state_score may be updated as the MAX of the state score at the rejection state (e.g., state 0) and the new_rejection_state_score as discussed above. For example, with respect to FIG. 6, operation 908 may provide, as discussed, for vectorized operation 606 to generate multiple element state score vector 605 for the current time instance from multiple element score summation vector 604.

Processing may continue at operation 909, where, for each rejections state, including the rejection state of the rejection model, the states may be updated based on the rejection state score determined at operation 908. For example, single rejections state 511 of rejection model 501 and those states of the key phrase model or models that transition from the rejection state may be updated with the rejection state score determined at operation 908. For example, with respect to Pseudo Code 1, operation 909 may correspond to "Update all Rejection States including 0 State" such that for state_idx that are members of initial_ states_idx_table, the state score is updated to the new_rejection_state_score as determined at operation 908.

Processing may continue at operation 910, where the final score for the key phrase model or models may be determined. The final score for the key phrase model or models may be determined using any suitable technique or techniques. When only a single key phrase model is implemented, the state score corresponding to the final state of the key phrase model may be accessed. For example, with respect to FIG. 6, if multiple element state score vector 605 represents a single key phrase model, score $S_N$ of current scores 652 may provide the final score. If multiple key phrase models are used, those scores of current scores 652 corresponding to final states of the key phrase models may be accessed and maximum of the final scores may be determined as the final score of operation 910. For example, with respect to Pseudo Code 1, operation 910 may correspond to "Determine Final Score for Key Phrase Models by Taking Best Final Score" such that a final score is initialized and then determined to be a maximum of the state scores of those state_idx that are members of phrase_model.FINAL_ STATES and a final_score determined at a previous iteration.

Processing may continue at operation 911, where the rejection model score and the final key phrase model score determined at operation 910 may be evaluated. The rejection model score and the final key phrase model score may be evaluated using any suitable technique or techniques. In an embodiment, a difference between the final key phrase model score and the rejection model score may be determined and compared to a threshold. If the difference is greater than the threshold, the key phrase corresponding to the final key phrase model score may be determined to be received and appropriate action may be taken (waking the device, performing a task, etc.). If not, no key phrase was detected and no action may be taken. For example, with respect to Pseudo Code 1, operation 911 may correspond to "Determine Difference Between Rejection Score and Final Score of Key Phrase Model" and "Return Normalized Score" where the comparison of the scores may be provided. With respect to FIG. 2, the score evaluation may be provided as key phrase score 215 and, if the score indicates an acceptable key phrase, system wake indicator 216 and/or system command 218 may be provided.

Figure 10:
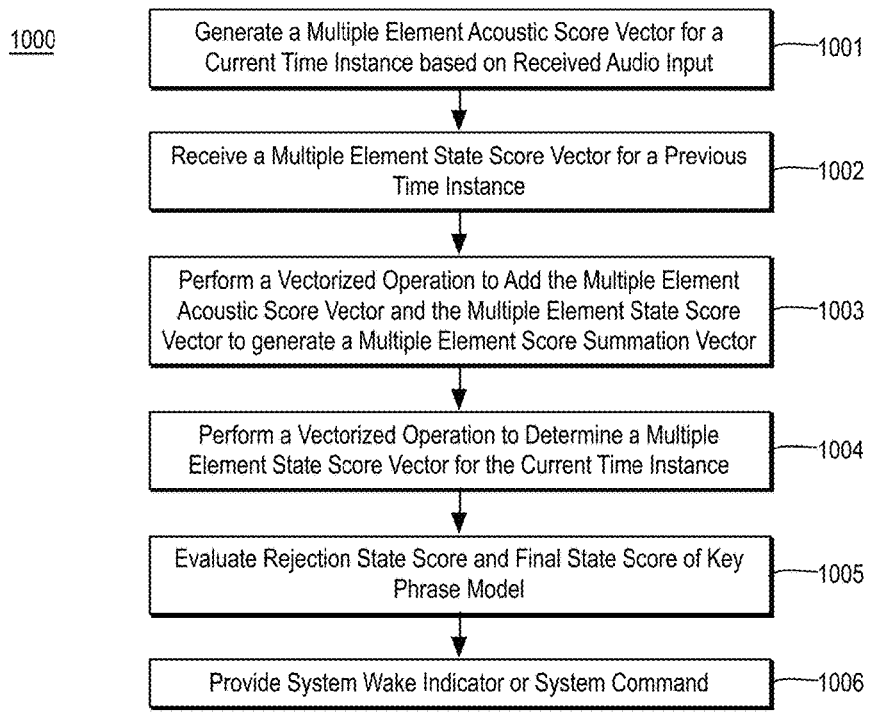
FIG. 10 is a flow diagram illustrating an example process for key phrase detection.

FIG. 10 is a flow diagram illustrating an example process 1000 for key phrase detection, arranged in accordance with at least some implementations of the present disclosure. Process 1000 may include one or more operations 1001-1006 as illustrated in FIG. 10. Process 1000 may form at least part of a key phrase detection process performed, for example, by system 200. Furthermore, process 1000 will be described herein in reference to system 1100 of FIG. 11.

Figure 11:
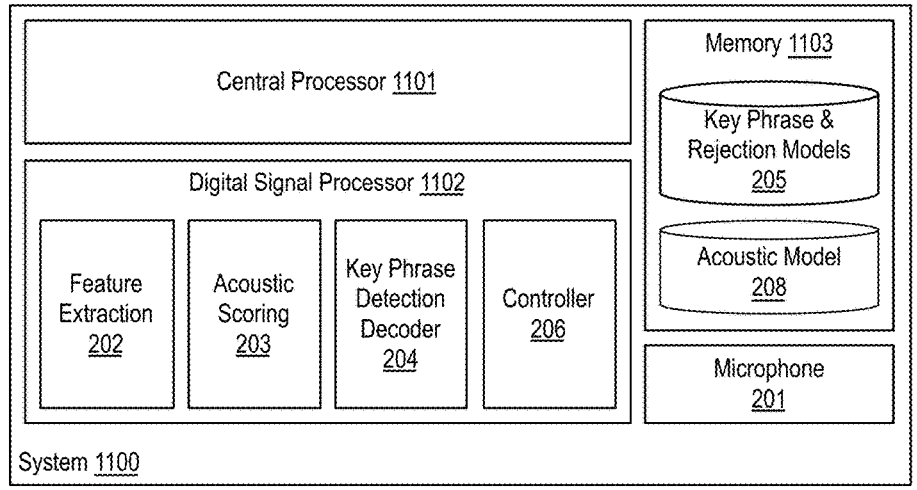
FIG. 11 is an illustrative diagram of an example system for performing key phrase detection.

FIG. 11 is an illustrative diagram of an example system 1100 for performing key phrase detection, arranged in accordance with at least some implementations of the present disclosure. As shown in FIG. 11, system 1100 may include a central processor 1101, a digital signal processor 1102, a memory 1103, and microphone 201. Also as shown, digital signal processor 1102 may include feature extraction module 202, acoustic scoring module 203, key phrase detection decoder 204, and controller 206. In some embodiments, digital signal processor 1102 may also include voice activity detection module 207. Also as shown, memory 1103 may store key phrase and rejection models 205 and acoustic model 208. Memory 1103 may also store audio data, input speech data, voice activity detection parameters or data, coefficient data, feature vectors, scores, output scores, key phrase scores, log likelihood scores, thresholds, multiple element acoustic score vectors, multiple element state score vector, iteration data, state values or scores, or any other data or data structures as discussed herein.

Central processor 1101 and digital signal processor 1102 may include any number and type of processing units that may provide the operations as discussed herein. Such operations may be implemented via software or hardware or a combination thereof. For example, digital signal processor 1102 may include circuitry dedicated to manipulate data obtained from memory 1103 or dedicated memory. Furthermore, central processor 1101 may include any number and type of processing units or modules that may provide control and other high level functions for system 1100 as well as the operations as discussed herein. In the illustrated example, system 1100 may be configured to perform key phrase detection.

Memory 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1103 may be implemented by cache memory. As shown, in an embodiment, feature extraction module 202, acoustic scoring module 203, log likelihood ratio decoder 204, and controller 206 may be implemented via digital signal processor 1002. In another embodiment, feature extraction module 202, acoustic scoring module 203, log likelihood ratio decoder 204, and controller 206 may be implemented via central processor 1001. In other embodiments, all or some or portions of feature extraction module 202, acoustic scoring module 203, log likelihood ratio decoder 204, and controller 206 may be implemented via an execution unit (EU). The EU may include, for example, programmable logic or circuitry such as a logic core or cores that may provide a wide array of programmable logic functions. In an embodiment, digital signal processor 1102 and memory 1103 may be provided or implemented as a system on a chip.

Returning to discussion of FIG. 10, process 1000 may begin at operation 1001, where a multiple element acoustic score vector may be generated for a current time instance based on received audio input. For example, the multiple element acoustic score vector may include a score for a single state rejection model and scores for at least one multiple state key phrase model such that the multiple state key phrase model corresponds to a predetermined key phrase. In an embodiment, digital signal processor 1102 generates the multiple element acoustic score vector based on audio input received by microphone 201. In an embodiment, generating the multiple element acoustic score vector for the current time instance includes determining the score for the single state rejection model as a maximum of a best rejection score corresponding to the single state rejection model and a best silence score corresponding to the single state rejection model. In an embodiment, generating the multiple element acoustic score vector for the current time instance includes accessing a deep neural network acoustic model to determine the scores for the multiple state key phrase model. In an embodiment, generating the multiple element acoustic score vector for the current time instance includes updating, for a silence state of the key phrase model, a score of the scores for the multiple state key phrase model corresponding to the silence state with a best silence score when the best silence score is greater than a current acoustic score of the silence state.

Processing may continue at operation 1002, where a multiple element state score vector for a previous time instance may be received. For example, the multiple element state score vector may include a previous state score for the single state rejection model and previous state scores for the multiple state key phrase model. In an embodiment, digital signal processor 1102 receives the multiple element state score vector from memory 1103. For example, the multiple element state score vector may be generated during a previous iteration of process 1000.

Processing may continue at operation 1003, where a vectorized operation may be performed to add the multiple element acoustic score vector and the multiple element state score vector to generate a multiple element score summation vector. In an embodiment, the vectorized operation is performed by digital signal processor 1102. The vectorized summation operation may be performed using any suitable technique or techniques. In an embodiment, the vectorized summation operation may be based on array programming, based on SIMD instructions, or in a hardware implementation such that the element by element sums are performed simultaneously, substantially simultaneously, in parallel, or the like.

Processing may continue at operation 1004, where a multiple element state score vector for the current time instance may be determined based on the multiple element score summation vector. For example, the second multiple element state score vector may include a current state score for the single state rejection model and current state scores for the multiple state key phrase model. The multiple element state score vector may be determined using any suitable technique or techniques. In an embodiment, the multiple element state score vector is determined by digital signal processor 1102. In an embodiment, the multiple element score summation vector includes a rejection state value corresponding to a sum of the score for the single state rejection model and the previous state score for the single state rejection model followed by subsequent key phrase model values corresponding to sums of scores for the multiple state key phrase model and previous state scores for the multiple state key phrase model. In an embodiment, determining the second multiple element state score vector for the current time instance based on the multiple element score summation vector includes performing a vectorized operation to determine a maximum of the rejection state value and a first value of the key phrase model values and at least a maximum of the first value and a second value of the key phrase model values. For example, the first value may correspond to an initial state of the multiple state key phrase model. In an embodiment, performing the vectorized operation further includes determining maxima between adjacent remaining values of the key phrase model values to provide the current state scores for the multiple state key phrase model.

The vectorized maxima operation may be performed using any suitable technique or techniques. In an embodiment, the vectorized summation operation may be based on array programming, based on SIMD instructions, or in a hardware implementation such that the element by element sums are performed simultaneously, substantially simultaneously, in parallel, or the like. Either or both of the vectorized operations discussed with respect to operations 1003 and 1004 may provide parallel or simultaneous processing. For example, the vectorized summation operation may add corresponding elements of the multiple element acoustic score vector and the multiple element state score vector simultaneously and/or the vectorized maxima operation may determine the maximum of the rejection state value and the first value of the key phrase model values and at least the maximum of the first value and the second value of the key phrase model values simultaneously.

Processing may continue at operation 1005, where the current state score for the single state rejection model and a final state score for the multiple state key phrase model may be evaluated to determine whether the received audio input is associated with the predetermined key phrase. The current state score for the single state rejection model and a final state score for the multiple state key phrase model may be evaluated using any suitable technique or techniques. In an embodiment, the current state score for the single state rejection model and a final state score for the multiple state key phrase model may be evaluated by digital signal processor 1102. In an embodiment, evaluating the current state score for the single state rejection model and the final state score for the multiple state key phrase model to determine whether the received audio input is associated with the predetermined key phrase includes determining a log likelihood score based on the current state score for the single state rejection model and the final state score for the multiple state key phrase model and comparing the log likelihood score to a threshold. For example, if the log likelihood score is greater than the threshold, a determination may be made that the received audio input is associated with the predetermined key phrase.

In an embodiment, process 1000 further includes determining, for a rejection model transition state of the key phrase model, a first rejection score as a sum of an acoustic score from the multiple element acoustic score vector corresponding to the rejection model transition state and an element state score from the multiple element state score vector corresponding to the rejection model transition state and updating, prior to evaluating the current state score for the single state rejection model and the final state score for the multiple state key phrase model to determine whether the received audio input is associated with the predetermined key phrase, the current state score for the single state rejection model with the maximum of the first rejection score and the previously determined current state score. For example, such techniques may provide a backward transition to the rejection state for a key phrase model.

Furthermore, in an embodiment, the second multiple element state score vector further includes second current state scores for a second multiple state key phrase model corresponding to a second predetermined key phrase and a spare state between the multiple state key phrase model and the second multiple state key phrase model the process 1000 further includes determining, prior to evaluating the current state score for the single state rejection model and the final state score for the multiple state key phrase model to determine whether the received audio input is associated with the predetermined key phrase, a maximum of the final state score for the multiple state key phrase model and a second final state score for the second multiple state key phrase model. For example, evaluating the current state score for the single state rejection model and the final state score for the multiple state key phrase model to determine whether the received audio input is associated with the predetermined key phrase may be performed only when the final state score is the maximum. When the second final state score is the maximum, the current state score for the single state rejection model and the second final state score for the second multiple state key phrase model are evaluated to determine whether the received audio input is associated with a second predetermined key phrase corresponding to the second multiple state key phrase model.

Processing may continue at operation 1006, where a system wake indicator and/or a system command may be provided when the received audio input is associated with the predetermined key phrase. For example, when a key phrase is detected a corresponding indicator such a system wake indicator and/or a system command such as a command for the system to perform task or the like may be issued based on the key phrase detection. For example, system 1100 may wake or perform a task based on a recognized key phrase.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
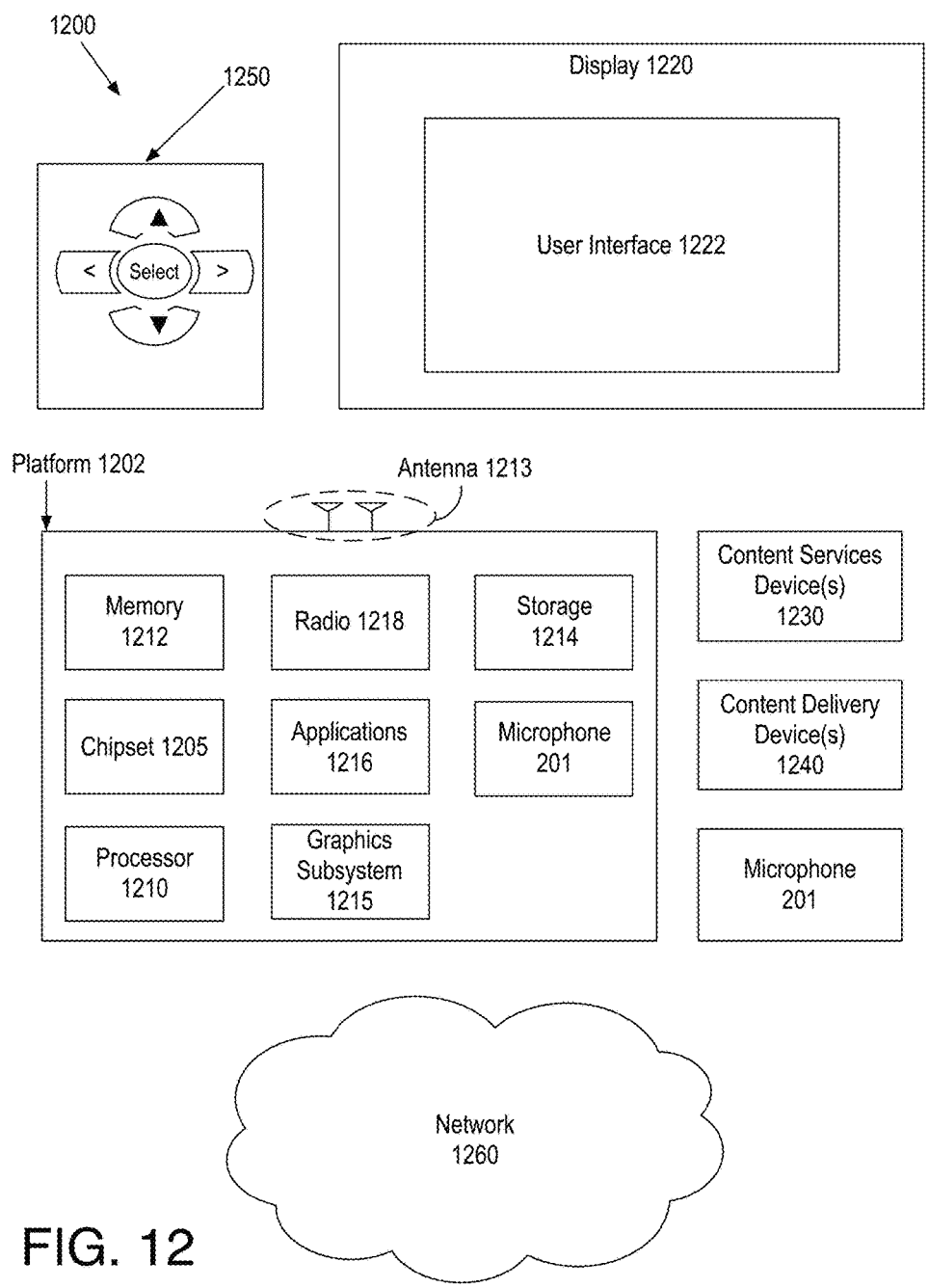
FIG. 12 is an illustrative diagram of an example system.

FIG. 12 is an illustrative diagram of an example system 1200, arranged in accordance with at least some implementations of the present disclosure. In various implementations, system 1200 may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. As shown, in some examples, system 1200 may include microphone 201 implemented via platform 1202. Platform 1202 may receive input speech via microphone 201 as discussed herein. A navigation controller 1250 including one or more navigation features may be used to interact with, for example, platform 1202 and/or display 1220. Each of these components is described in greater detail below.

In various implementations, system 1200 may provide key phrase detection as described. For example, key phrase detection may be provide wake on voice capability for a device or environment as described. In other implementations, system 1200 may provide for generating a key phrase detection model (e.g., including an acoustic model, a rejection model, and a key phrase model). Such training may be performed offline prior to key phrase detection for example.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1215. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
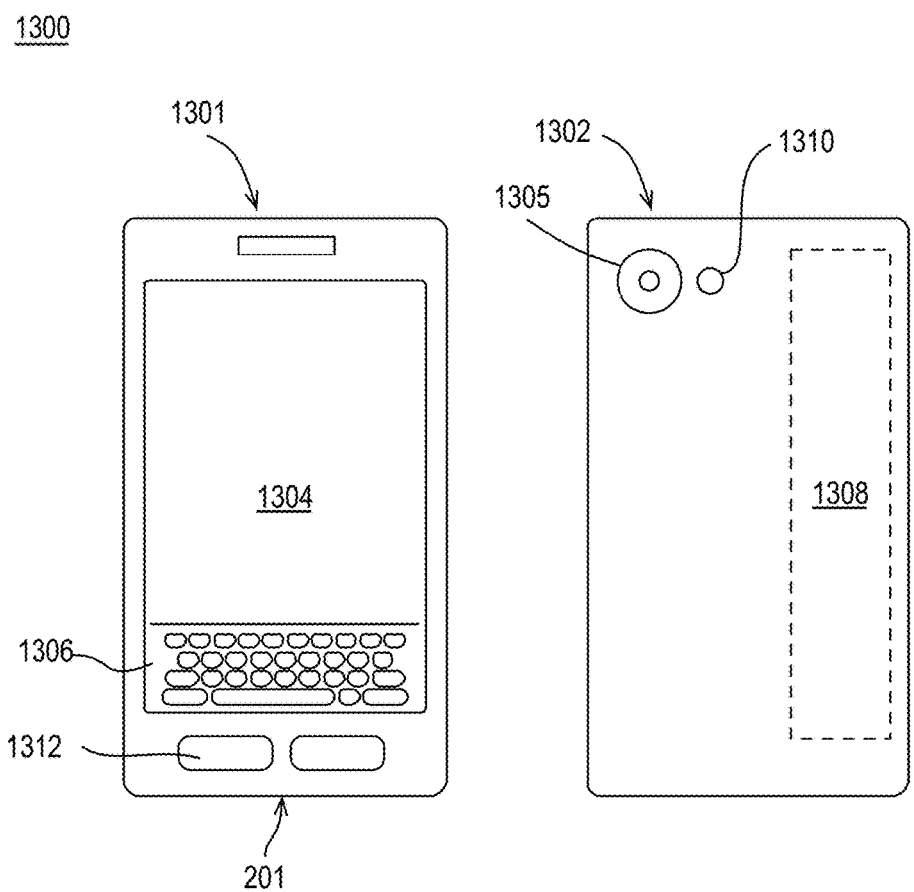
FIG. 13 illustrates an example device, all arranged in accordance with at least some implementations of the present disclosure.

As described above, system 1200 may be embodied in varying physical styles or form factors. FIG. 13 illustrates implementations of a small form factor device, arranged in accordance with at least some implementations of the present disclosure. In some examples, system 1200 may be implemented via device 1300. In other examples, other devices or systems, or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone 201, or may be digitized by a voice recognition device. As shown, device 1300 may include a camera 1305 (e.g., including a lens, an aperture, and an imaging sensor) and a flash 1310 integrated into back 1302 (or elsewhere) of device 1300.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for key phrase detection comprises generating a multiple element acoustic score vector for a current time instance based on received audio input such that the multiple element acoustic score vector comprises at least an acoustic score for at least one single state rejection model and acoustic scores for at least one multiple state key phrase model, and such that the multiple state key phrase model corresponds to a predetermined key phrase, receiving a multiple element state score vector for a previous time instance such that the multiple element state score vector comprises a previous state score for the single state rejection model and previous state scores for the multiple state key phrase model, performing a vectorized operation to add the multiple element acoustic score vector and the multiple element state score vector to generate a multiple element score summation vector, determining a second multiple element state score vector for the current time instance based on the multiple element score summation vector, such that the second multiple element state score vector comprises a current state score for the single state rejection model and current state scores for the multiple state key phrase model, evaluating the current state score for the single state rejection model and a final state score for the multiple state key phrase model to determine whether the received audio input is associated with the predetermined key phrase, and providing at least one of a system wake indicator or a system command when the received audio input is associated with the predetermined key phrase.

Further to the first embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and determining the second multiple element state score vector for the current time instance based on the multiple element score summation vector comprises performing a second vectorized operation to determine a maximum of the rejection state value and a first value of the key phrase model values and at least a maximum of the first value and a second value of the key phrase model values.

Further to the first embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and determining the second multiple element state score vector for the current time instance based on the multiple element score summation vector comprises performing a second vectorized operation to determine a maximum of the rejection state value and a first value of the key phrase model values and at least a maximum of the first value and a second value of the key phrase model values such that the first value corresponds to an initial state of the multiple state key phrase model.

Further to the first embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and determining the second multiple element state score vector for the current time instance based on the multiple element score summation vector comprises performing a second vectorized operation to determine a maximum of the rejection state value and a first value of the key phrase model values and at least a maximum of the first value and a second value of the key phrase model values such that performing the second vectorized operation further determines maxima between adjacent remaining values of the key phrase model values to provide the current state scores for the multiple state key phrase model.

Further to the first embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and determining the second multiple element state score vector for the current time instance based on the multiple element score summation vector comprises performing a second vectorized operation to determine a maximum of the rejection state value and a first value of the key phrase model values and at least a maximum of the first value and a second value of the key phrase model values such that the vectorized operation adds corresponding elements of the multiple element acoustic score vector and the multiple element state score vector simultaneously and the second vectorized operation determines the maximum of the rejection state value and the first value of the key phrase model values and at least the maximum of the first value and the second value of the key phrase model values simultaneously.

Further to the first embodiments, generating the multiple element acoustic score vector for the current time instance comprises determining the score for the single state rejection model as a maximum of a best rejection score corresponding to the single state rejection model and a best silence score corresponding to the single state rejection model and accessing a deep neural network acoustic model to determine the scores for the multiple state key phrase model.

Further to the first embodiments, generating the multiple element acoustic score vector for the current time instance comprises updating, for a silence state of the key phrase model, a first score of the scores for the multiple state key phrase model corresponding to the silence state with a best silence score when the best silence score is greater than a current acoustic score of the silence state.

Further to the first embodiments, the method further comprises determining, for a rejection model state of the key phrase model, a first rejection score as a sum of an acoustic score from the multiple element acoustic score vector corresponding to the rejection model transition state and an element state score from the multiple element state score vector corresponding to the rejection model transition state and updating, prior to evaluating the current state score for the single state rejection model and the final state score for the multiple state key phrase model to determine whether the received audio input is associated with the predetermined key phrase, the current state score for the single state rejection model with the maximum of the first rejection score and the previously determined current state score.

Further to the first embodiments, the second multiple element state score vector further comprises second current state scores for a second multiple state key phrase model corresponding to a second predetermined key phrase and a spare state between the multiple state key phrase model and the second multiple state key phrase model and the method further comprises determining, prior to evaluating the current state score for the single state rejection model and the final state score for the multiple state key phrase model to determine whether the received audio input is associated with the predetermined key phrase, a maximum of the final state score for the multiple state key phrase model and a second final state score for the second multiple state key phrase model such that evaluating the current state score for the single state rejection model and the final state score for the multiple state key phrase model to determine whether the received audio input is associated with the predetermined key phrase is performed when the final state score is the maximum.

Further to the first embodiments, evaluating the current state score for the single state rejection model and the final state score for the multiple state key phrase model to determine whether the received audio input is associated with the predetermined key phrase comprises determining a log likelihood score based on the current state score for the single state rejection model and the final state score for the multiple state key phrase model and comparing the log likelihood score to a threshold.

In one or more second embodiments, a system for performing key phrase detection comprises a memory configured to store a multiple element state score vector for a previous time instance, such that the multiple element state score vector comprises a previous state score for at least one single state rejection model and previous state scores for at least one multiple state key phrase model and the multiple state key phrase model corresponds to a predetermined key phrase and a digital signal processor coupled to the memory, the digital signal processor to generate a multiple element acoustic score vector for a current time instance based on received audio input, such that the multiple element acoustic score vector comprises at least an acoustic score for the single state rejection model and scores for the multiple state key phrase model, to receive the multiple element state score vector for the previous time instance from the memory, to perform a vectorized operation to add the multiple element acoustic score vector and the multiple element state score vector to generate a multiple element score summation vector, to determine a second multiple element state score vector for the current time instance based on the multiple element score summation vector, such that the second multiple element state score vector comprises a current state score for the single state rejection model and current state scores for the multiple state key phrase model, to evaluate the current state score for the single state rejection model and a final state score for the multiple state key phrase model to determine whether the received audio input is associated with the predetermined key phrase, and to provide at least one of a system wake indicator or a system command when the received audio input is associated with the predetermined key phrase.

Further to the second embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and to determine the second multiple element state score vector for the current time instance based on the multiple element score summation vector comprises the digital signal processor to perform a second vectorized operation to determine a maximum of the rejection state value and a first value of the key phrase model values and at least a maximum of the first value and a second value of the key phrase model values.

Further to the second embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and to determine the second multiple element state score vector for the current time instance based on the multiple element score summation vector comprises the digital signal processor to perform a second vectorized operation to determine a maximum of the rejection state value and a first value of the key phrase model values and at least a maximum of the first value and a second value of the key phrase model values such that the first value corresponds to an initial state of the multiple state key phrase model.

Further to the second embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and to determine the second multiple element state score vector for the current time instance based on the multiple element score summation vector comprises the digital signal processor to perform a second vectorized operation to determine a maximum of the rejection state value and a first value of the key phrase model values and at least a maximum of the first value and a second value of the key phrase model values such that to perform the second vectorized operation further comprises the digital signal processor to determine maxima between adjacent remaining values of the key phrase model values to provide the current state scores for the multiple state key phrase model.

Further to the second embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and to determine the second multiple element state score vector for the current time instance based on the multiple element score summation vector comprises the digital signal processor to perform a second vectorized operation to determine a maximum of the rejection state value and a first value of the key phrase model values and at least a maximum of the first value and a second value of the key phrase model values such that the vectorized operation adds corresponding elements of the multiple element acoustic score vector and the multiple element state score vector simultaneously and the second vectorized operation determines the maximum of the rejection state value and the first value of the key phrase model values and at least the maximum of the first value and the second value of the key phrase model values simultaneously.

Further to the second embodiments, to generate the multiple element acoustic score vector for the current time instance comprises the digital signal processor to update, for a silence state of the key phrase model, a first score of the scores for the multiple state key phrase model corresponding to the silence state with a best silence score when the best silence score is greater than a current acoustic score of the silence state.

Further to the second embodiments, to generate the multiple element acoustic score vector for the current time instance comprises the digital signal processor to update, for a silence state of the key phrase model, a first score of the scores for the multiple state key phrase model corresponding to the silence state with a best silence score when the best silence score is greater than a current acoustic score of the silence state.

Further to the second embodiments, the digital signal processor is further to determine, for a rejection model state of the key phrase model, a first rejection score as a sum of an acoustic score from the multiple element acoustic score vector corresponding to the rejection model transition state and an element state score from the multiple element state score vector corresponding to the rejection model transition state and to update, prior to evaluating the current state score for the single state rejection model and the final state score for the multiple state key phrase model to determine whether the received audio input is associated with the predetermined key phrase, the current state score for the single state rejection model with the maximum of the first rejection score and the previously determined current state score.

Further to the second embodiments, the second multiple element state score vector further comprises second current state scores for a second multiple state key phrase model corresponding to a second predetermined key phrase and a spare state between the multiple state key phrase model and the second multiple state key phrase model, the digital signal processor further to determine, prior to evaluating the current state score for the single state rejection model and the final state score for the multiple state key phrase model to determine whether the received audio input is associated with the predetermined key phrase, a maximum of the final state score for the multiple state key phrase model and a second final state score for the second multiple state key phrase model, such that evaluating the current state score for the single state rejection model and the final state score for the multiple state key phrase model to determine whether the received audio input is associated with the predetermined key phrase is performed when the final state score is the maximum.

Further to the second embodiments, to evaluate the current state score for the single state rejection model and the final state score for the multiple state key phrase model to determine whether the received audio input is associated with the predetermined key phrase comprises the digital signal processor to determine a log likelihood score based on the current state score for the single state rejection model and the final state score for the multiple state key phrase model and compare the log likelihood score to a threshold.

In one or more third embodiments, a system comprises means for generating a multiple element acoustic score vector for a current time instance based on received audio input, such that the multiple element acoustic score vector comprises at least an acoustic score for at least one single state rejection model and acoustic scores for at least one multiple state key phrase model, and such that the multiple state key phrase model corresponds to a predetermined key phrase, means for receiving a multiple element state score vector for a previous time instance, such that the multiple element state score vector comprises a previous state score for the single state rejection model and previous state scores for the multiple state key phrase model, means for performing a vectorized operation to add the multiple element acoustic score vector and the multiple element state score vector to generate a multiple element score summation vector, means for determining a second multiple element state score vector for the current time instance based on the multiple element score summation vector, such that the second multiple element state score vector comprises a current state score for the single state rejection model and current state scores for the multiple state key phrase model, means for evaluating the current state score for the single state rejection model and a final state score for the multiple state key phrase model to determine whether the received audio input is associated with the predetermined key phrase, and means for providing at least one of a system wake indicator or a system command when the received audio input is associated with the predetermined key phrase.

Further to the third embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and the means for determining the second multiple element state score vector for the current time instance based on the multiple element score summation vector comprise means for performing a second vectorized operation to determine a maximum of the rejection state value and a first value of the key phrase model values and at least a maximum of the first value and a second value of the key phrase model values.

Further to the third embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and the means for determining the second multiple element state score vector for the current time instance based on the multiple element score summation vector comprise means for performing a second vectorized operation to determine a maximum of the rejection state value and a first value of the key phrase model values and at least a maximum of the first value and a second value of the key phrase model values such that the means for performing the second vectorized operation determine maxima between adjacent remaining values of the key phrase model values to provide the current state scores for the multiple state key phrase model.

Further to the third embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and the means for determining the second multiple element state score vector for the current time instance based on the multiple element score summation vector comprise means for performing a second vectorized operation to determine a maximum of the rejection state value and a first value of the key phrase model values and at least a maximum of the first value and a second value of the key phrase model values such that the vectorized operation adds corresponding elements of the multiple element acoustic score vector and the multiple element state score vector simultaneously and the second vectorized operation determines the maximum of the rejection state value and the first value of the key phrase model values and at least the maximum of the first value and the second value of the key phrase model values simultaneously.

Further to the third embodiments, the means for generating the multiple element acoustic score vector for the current time instance comprise means for updating, for a silence state of the key phrase model, a first score of the scores for the multiple state key phrase model corresponding to the silence state with a best silence score when the best silence score is greater than a current acoustic score of the silence state.

Further to the third embodiments, the system further comprises means for determining, for a rejection model state of the key phrase model, a first rejection score as a sum of an acoustic score from the multiple element acoustic score vector corresponding to the rejection model transition state and an element state score from the multiple element state score vector corresponding to the rejection model transition state and means for updating, prior to evaluating the current state score for the single state rejection model and the final state score for the multiple state key phrase model to determine whether the received audio input is associated with the predetermined key phrase, the current state score for the single state rejection model with the maximum of the first rejection score and the previously determined current state score.

Further to the third embodiments, the second multiple element state score vector further comprises second current state scores for a second multiple state key phrase model corresponding to a second predetermined key phrase and a spare state between the multiple state key phrase model and the second multiple state key phrase model, the system further comprising means for determining, prior to evaluating the current state score for the single state rejection model and the final state score for the multiple state key phrase model to determine whether the received audio input is associated with the predetermined key phrase, a maximum of the final state score for the multiple state key phrase model and a second final state score for the second multiple state key phrase model such that the means for evaluating the current state score for the single state rejection model and the final state score for the multiple state key phrase model to determine whether the received audio input is associated with the predetermined key phrase is performed when the final state score is the maximum.

In one or more fourth embodiments, at least one machine readable medium comprises a plurality of instructions that, in response to being executed on a device, cause the device to perform key phrase detection by generating a multiple element acoustic score vector for a current time instance based on received audio input such that the multiple element acoustic score vector comprises at least an acoustic score for at least one single state rejection model and acoustic scores for at least one multiple state key phrase model, and such that the multiple state key phrase model corresponds to a predetermined key phrase, receiving a multiple element state score vector for a previous time instance such that the multiple element state score vector comprises a previous state score for the single state rejection model and previous state scores for the multiple state key phrase model, performing a vectorized operation to add the multiple element acoustic score vector and the multiple element state score vector to generate a multiple element score summation vector, determining a second multiple element state score vector for the current time instance based on the multiple element score summation vector, such that the second multiple element state score vector comprises a current state score for the single state rejection model and current state scores for the multiple state key phrase model, evaluating the current state score for the single state rejection model and a final state score for the multiple state key phrase model to determine whether the received audio input is associated with the predetermined key phrase, and providing at least one of a system wake indicator or a system command when the received audio input is associated with the predetermined key phrase.

Further to the fourth embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and determining the second multiple element state score vector for the current time instance based on the multiple element score summation vector comprises performing a second vectorized operation to determine a maximum of the rejection state value and a first value of the key phrase model values and at least a maximum of the first value and a second value of the key phrase model values.

Further to the fourth embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and determining the second multiple element state score vector for the current time instance based on the multiple element score summation vector comprises performing a second vectorized operation to determine a maximum of the rejection state value and a first value of the key phrase model values and at least a maximum of the first value and a second value of the key phrase model values such that performing the second vectorized operation further determines maxima between adjacent remaining values of the key phrase model values to provide the current state scores for the multiple state key phrase model.

Further to the fourth embodiments, the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and determining the second multiple element state score vector for the current time instance based on the multiple element score summation vector comprises performing a second vectorized operation to determine a maximum of the rejection state value and a first value of the key phrase model values and at least a maximum of the first value and a second value of the key phrase model values such that the vectorized operation adds corresponding elements of the multiple element acoustic score vector and the multiple element state score vector simultaneously and the second vectorized operation determines the maximum of the rejection state value and the first value of the key phrase model values and at least the maximum of the first value and the second value of the key phrase model values simultaneously.

Further to the fourth embodiments, generating the multiple element acoustic score vector for the current time instance comprises updating, for a silence state of the key phrase model, a first score of the scores for the multiple state key phrase model corresponding to the silence state with a best silence score when the best silence score is greater than a current acoustic score of the silence state.

Further to the fourth embodiments, the machine readable medium further comprising instructions that, in response to being executed on the device, cause the device to perform key phrase detection by determining, for a rejection model state of the key phrase model, a first rejection score as a sum of an acoustic score from the multiple element acoustic score vector corresponding to the rejection model transition state and an element state score from the multiple element state score vector corresponding to the rejection model transition state and updating, prior to evaluating the current state score for the single state rejection model and the final state score for the multiple state key phrase model to determine whether the received audio input is associated with the predetermined key phrase, the current state score for the single state rejection model with the maximum of the first rejection score and the previously determined current state score.

Further to the fourth embodiments, the second multiple element state score vector further comprises second current state scores for a second multiple state key phrase model corresponding to a second predetermined key phrase and a spare state between the multiple state key phrase model and the second multiple state key phrase model, the machine readable medium further comprising instructions that, in response to being executed on the device, cause the device to perform key phrase detection by determining, prior to evaluating the current state score for the single state rejection model and the final state score for the multiple state key phrase model to determine whether the received audio input is associated with the predetermined key phrase, a maximum of the final state score for the multiple state key phrase model and a second final state score for the second multiple state key phrase model such that evaluating the current state score for the single state rejection model and the final state score for the multiple state key phrase model to determine whether the received audio input is associated with the predetermined key phrase is performed when the final state score is the maximum.

In one or more fifth embodiments, at least one machine readable medium may include a plurality of instructions that, in response to being executed on a computing device, cause the computing device to perform a method or any functions according to any one of the above embodiments.

In one or more sixth embodiments, an apparatus or a system may include means for performing a method or any functions according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for key phrase detection comprising:
    generating a multiple element acoustic score vector for a current time instance based on received audio input, wherein the multiple element acoustic score vector comprises at least an acoustic score for at least one single state rejection model and acoustic scores for at least one multiple state key phrase model, and wherein the multiple state key phrase model corresponds to a predetermined key phrase;
    receiving a multiple element state score vector for a previous time instance, wherein the multiple element state score vector comprises a previous state score for the single state rejection model and previous state scores for the multiple state key phrase model;
    performing a vectorized operation to add the multiple element acoustic score vector and the multiple element state score vector to generate a multiple element score summation vector;
    determining a second multiple element state score vector for the current time instance based on the multiple element score summation vector, wherein the second multiple element state score vector comprises a current state score for the single state rejection model and current state scores for the multiple state key phrase model;
    evaluating the current state score for the single state rejection model and a final state score for the multiple state key phrase model to detect the predetermined key phrase in the received audio input; and
    providing at least one of a system wake indicator or a system command in response to the detected predetermined key phrase.

2. The method of claim 1, wherein the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and wherein determining the second multiple element state score vector for the current time instance based on the multiple element score summation vector comprises:
    performing a second vectorized operation to determine a maximum of the rejection state value and a first value of the key phrase model values and at least a maximum of the first value and a second value of the key phrase model values.

3. The method of claim 2, wherein the first value corresponds to an initial state of the multiple state key phrase model.

4. The method of claim 2, wherein performing the second vectorized operation further determines maxima between adjacent remaining values of the key phrase model values to provide the current state scores for the multiple state key phrase model.

5. The method of claim 2, wherein the vectorized operation adds corresponding elements of the multiple element acoustic score vector and the multiple element state score vector simultaneously and the second vectorized operation determines the maximum of the rejection state value and the first value of the key phrase model values and at least the maximum of the first value and the second value of the key phrase model values simultaneously.

6. The method of claim 1, wherein generating the multiple element acoustic score vector for the current time instance comprises:
    determining the score for the single state rejection model as a maximum of a best rejection score corresponding to the single state rejection model and a best silence score corresponding to the single state rejection model; and
    accessing a deep neural network acoustic model to determine the scores for the multiple state key phrase model.

7. The method of claim 1, wherein generating the multiple element acoustic score vector for the current time instance comprises:

updating, for a silence state of the key phrase model, a first score of the scores for the multiple state key phrase model corresponding to the silence state with a best silence score when the best silence score is greater than a current acoustic score of the silence state.

8. The method of claim 1, further comprising:
determining, for a rejection model state of the key phrase model, a first rejection score as a sum of an acoustic score from the multiple element acoustic score vector corresponding to the rejection model transition state and an element state score from the multiple element state score vector corresponding to the rejection model transition state; and
updating, prior to evaluating the current state score for the single state rejection model and the final state score for the multiple state key phrase model to determine whether the received audio input is associated with the predetermined key phrase, the current state score for the single state rejection model with the maximum of the first rejection score and the previously determined current state score.

9. The method of claim 1, wherein the second multiple element state score vector further comprises second current state scores for a second multiple state key phrase model corresponding to a second predetermined key phrase and a spare state between the multiple state key phrase model and the second multiple state key phrase model, the method further comprising:
determining, prior to evaluating the current state score for the single state rejection model and the final state score for the multiple state key phrase model to determine whether the received audio input is associated with the predetermined key phrase, a maximum of the final state score for the multiple state key phrase model and a second final state score for the second multiple state key phrase model,
wherein evaluating the current state score for the single state rejection model and the final state score for the multiple state key phrase model to determine whether the received audio input is associated with the predetermined key phrase is performed when the final state score is the maximum.

10. The method of claim 1, wherein evaluating the current state score for the single state rejection model and the final state score for the multiple state key phrase model to determine whether the received audio input is associated with the predetermined key phrase comprises:
determining a log likelihood score based on the current state score for the single state rejection model and the final state score for the multiple state key phrase model; and
comparing the log likelihood score to a threshold.

11. A system for performing key phrase detection comprising:
a memory configured to store a multiple element state score vector for a previous time instance, wherein the multiple element state score vector comprises a previous state score for at least one single state rejection model and previous state scores for at least one multiple state key phrase model, wherein the multiple state key phrase model corresponds to a predetermined key phrase; and
a digital signal processor coupled to the memory, the digital signal processor to generate a multiple element acoustic score vector for a current time instance based on received audio input, wherein the multiple element acoustic score vector comprises at least an acoustic score for the single state rejection model and scores for the multiple state key phrase model, to receive the multiple element state score vector for the previous time instance from the memory, to perform a vectorized operation to add the multiple element acoustic score vector and the multiple element state score vector to generate a multiple element score summation vector, to determine a second multiple element state score vector for the current time instance based on the multiple element score summation vector, wherein the second multiple element state score vector comprises a current state score for the single state rejection model and current state scores for the multiple state key phrase model, to evaluate the current state score for the single state rejection model and a final state score for the multiple state key phrase model to detect the predetermined key phrase in the received audio input, and to provide at least one of a system wake indicator or a system command in response to the detected predetermined key phrase.

12. The system of claim 11, wherein the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and wherein to determine the second multiple element state score vector for the current time instance based on the multiple element score summation vector comprises the digital signal processor to perform a second vectorized operation to determine a maximum of the rejection state value and a first value of the key phrase model values and at least a maximum of the first value and a second value of the key phrase model values.

13. The system of claim 12, wherein to perform the second vectorized operation further comprises the digital signal processor to determine maxima between adjacent remaining values of the key phrase model values to provide the current state scores for the multiple state key phrase model.

14. The system of claim 12, wherein the vectorized operation adds corresponding elements of the multiple element acoustic score vector and the multiple element state score vector simultaneously and the second vectorized operation determines the maximum of the rejection state value and the first value of the key phrase model values and at least the maximum of the first value and the second value of the key phrase model values simultaneously.

15. The system of claim 11, wherein to generate the multiple element acoustic score vector for the current time instance comprises the digital signal processor to update, for a silence state of the key phrase model, a first score of the scores for the multiple state key phrase model corresponding to the silence state with a best silence score when the best silence score is greater than a current acoustic score of the silence state.

16. The system of claim 11, the digital signal processor is further to determine, for a rejection model state of the key phrase model, a first rejection score as a sum of an acoustic score from the multiple element acoustic score vector corresponding to the rejection model transition state and an element state score from the multiple element state score vector corresponding to the rejection model transition state and to update, prior to evaluating the current state score for the single state rejection model and the final state score for the multiple state key phrase model to determine whether the received audio input is associated with the predetermined key phrase, the current state score for the single state rejection model with the maximum of the first rejection score and the previously determined current state score.

17. The system of claim 11, wherein the second multiple element state score vector further comprises second current state scores for a second multiple state key phrase model corresponding to a second predetermined key phrase and a spare state between the multiple state key phrase model and the second multiple state key phrase model, the digital signal processor further to determine, prior to evaluating the current state score for the single state rejection model and the final state score for the multiple state key phrase model to determine whether the received audio input is associated with the predetermined key phrase, a maximum of the final state score for the multiple state key phrase model and a second final state score for the second multiple state key phrase model, wherein evaluating the current state score for the single state rejection model and the final state score for the multiple state key phrase model to determine whether the received audio input is associated with the predetermined key phrase is performed when the final state score is the maximum.

18. The system of claim 11, wherein the memory and the digital signal processor are implemented as a system on a chip.

19. At least one non-transitory computer readable medium comprising a plurality of instruction that, in response to being executed on a device, cause the device to perform key phrase detection by:
generating a multiple element acoustic score vector for a current time instance based on received audio input, wherein the multiple element acoustic score vector comprises at least an acoustic score for at least one single state rejection model and acoustic scores for at least one multiple state key phrase model, and wherein the multiple state key phrase model corresponds to a predetermined key phrase;
receiving a multiple element state score vector for a previous time instance, wherein the multiple element state score vector comprises a previous state score for the single state rejection model and previous state scores for the multiple state key phrase model;
performing a vectorized operation to add the multiple element acoustic score vector and the multiple element state score vector to generate a multiple element score summation vector;
determining a second multiple element state score vector for the current time instance based on the multiple element score summation vector, wherein the second multiple element state score vector comprises a current state score for the single state rejection model and current state scores for the multiple state key phrase model;
evaluating the current state score for the single state rejection model and a final state score for the multiple state key phrase model to detect the predetermined key phrase in the received audio input; and
providing at least one of a system wake indicator or a system command in response to the detected predetermined key phrase.

20. The non-transitory computer readable medium of claim 19, wherein the multiple element score summation vector comprises a rejection state value corresponding to a sum of the acoustic score for the single state rejection model and the previous state score for the single state rejection model followed by subsequent key phrase model values corresponding to sums of acoustic scores for the multiple state key phrase model and previous state scores for the multiple state key phrase model, and wherein determining the second multiple element state score vector for the current time instance based on the multiple element score summation vector comprises:
performing a second vectorized operation to determine a maximum of the rejection state value and a first value of the key phrase model values and at least a maximum of the first value and a second value of the key phrase model values.

21. The non-transitory computer readable medium of claim 20, wherein performing the second vectorized operation further determines maxima between adjacent remaining values of the key phrase model values to provide the current state scores for the multiple state key phrase model.

22. The non-transitory computer readable medium of claim 20, wherein performing the second vectorized corresponding elements of the multiple element acoustic score vector and the multiple element state score vector simultaneously and the second vectorized operation determines the maximum of the rejection state value and the first value of the key phrase model values and at least the maximum of the first value and the second value of the key phrase model values simultaneously.

23. The non-transitory computer readable medium of claim 19, wherein generating the multiple element acoustic score vector for the current time instance comprises:
updating, for a silence state of the key phrase model, a first score of the scores for the multiple state key phrase model corresponding to the silence state with a best silence score when the best silence score is greater than a current acoustic score of the silence state.

24. The non-transitory computer readable medium of claim 19, further comprising instruction that, in response to being executed on the device, cause the device to perform key phrase detection by:
determining, for a rejection model state of the key phrase model, a first rejection score as a sum of an acoustic score from the multiple element acoustic score vector corresponding to the rejection model transition state and an element state score from the multiple element state score vector corresponding to the rejection model transition state; and
updating, prior to evaluating the current state score for the single state rejection model and the final state score for the multiple state key phrase model to determine whether the received audio input is associated with the predetermined key phrase, the current state score for the single state rejection model with the maximum of the first rejection score and the previously determined current state score.

25. The non-transitory computer readable medium of claim 19, wherein the second multiple element state score vector further comprises second current state scores for a second multiple state key phrase model corresponding to a second predetermined key phrase and a spare state between the multiple state key phrase model and the second multiple state key phrase model, the machine readable medium further comprising instructions that, in response to being executed on the device, cause the device to perform key phrase detection by:
determining, prior to evaluating the current state score for the single state rejection model and the final state score for the multiple state key phrase model to determine whether the received audio input is associated with the predetermined key phrase, a maximum of the final state score for the multiple state key phrase model and a second final state score for the second multiple state key phrase model, wherein evaluating the current state score for the single state rejection model and the final state score for the multiple state key phrase model to determine whether the received audio input is associated with the predetermined key phrase is performed when the final state score is the maximum.

* * * * *